United States Patent [19]

Yamamura et al.

[11] Patent Number: 5,576,406
[45] Date of Patent: Nov. 19, 1996

[54] CURABLE COMPOSITION AND METHOD FOR FORMING A FILM USING THE SAME

[75] Inventors: Kazuo Yamamura, Sakai; Masataka Ooka, Nara, both of Japan

[73] Assignee: Dainippon Ink and Chemicals, Inc., Tokyo, Japan

[21] Appl. No.: 351,416

[22] PCT Filed: Apr. 20, 1994

[86] PCT No.: PCT/JP94/00648

§ 371 Date: Dec. 15, 1994

§ 102(e) Date: Dec. 15, 1994

[87] PCT Pub. No.: WO94/24212

PCT Pub. Date: Oct. 27, 1994

[30] Foreign Application Priority Data

| Apr. 20, 1993 | [JP] | Japan | 5-092968 |
| Apr. 21, 1993 | [JP] | Japan | 5-094295 |
| Sep. 6, 1993 | [JP] | Japan | 5-221115 |
| Oct. 20, 1993 | [JP] | Japan | 5-262344 |
| Dec. 20, 1993 | [JP] | Japan | 5-319700 |
| Mar. 10, 1994 | [JP] | Japan | 6-039632 |

[51] Int. Cl.$^6$ .................. C08L 101/08; C08F 220/28; C08F 220/32; C08F 218/16

[52] U.S. Cl. .................. 526/320; 427/404; 427/407.1; 427/409; 427/410; 525/328.9; 525/329.2; 525/340; 525/342; 525/343; 525/353; 525/374; 526/288; 526/302; 526/303.1; 526/304; 526/328.5; 526/332

[58] Field of Search .................. 525/330.4, 343; 526/320; 427/404, 409, 410

[56] References Cited

U.S. PATENT DOCUMENTS

| 4,384,097 | 5/1983 | Wingler et al. | 526/328.5 |
| 5,198,503 | 3/1993 | Numa | 525/288 |
| 5,264,468 | 11/1993 | Miyahara | 523/400 |
| 5,356,996 | 10/1994 | Nakao | 525/158 |
| 5,409,994 | 4/1995 | Nakao | 525/160 |

FOREIGN PATENT DOCUMENTS

| 0027221 | 4/1981 | European Pat. Off. . |
| 2941586 | 4/1981 | Germany . |
| 56-65115 | 6/1981 | Japan . |
| 4-219362 | 8/1992 | Japan . |

Primary Examiner—Fred Zitomer
Attorney, Agent, or Firm—Armstrong, Westerman, Hattori, McLeland & Naughton

[57] ABSTRACT

It is an objective of the present invention to provide, in particular, a curable composition of an extremely high utility which yields a cured film having excellent acid resistance and the like. The curable composition of the present invention is used mainly for paints, adhesives, or sealing agents. The curable composition is based on crosslinking reaction between a specific substituted methyl ester group exemplified by an alkoxymethyl ester group and other functional groups, i.e., an epoxy group and an active hydrogen-containing group such as a hydroxyl group, a carbamate group, and an acetoacetoxy group. Thus, the present invention provides basically two types of compositions: one is the composition containing a self-crosslinkable polymer possessing both a substituted methyl ester group and an active hydrogen-containing group and/or an epoxy group, the other is the composition containing a compound possessing a substituted methyl ester group and a compound containing an active hydrogen-containing group and/or an epoxy group.

20 Claims, No Drawings

CURABLE COMPOSITION AND METHOD FOR FORMING A FILM USING THE SAME

FIELD OF THE ART

The present invention relates to a novel and useful curable composition. More specifically, the present invention relates to a curable composition possessing a superior curability characterized in employing as reactive functional groups a specific substituted methyl ester group and an active hydrogen-containing group and/or an epoxy group. Moreover, the present invention relates to a curable composition with an extremely high utility for providing a cured film possessing various properties such as acid resistance, and the like.

The curable composition according to the present invention can be widely used in a variety of different fields such as paints, i.e., coatings for metals and the like, adhesive agents, sealing agents, casting resins, and the like.

In addition the present invention also relates to a method for forming a film using a liquid paint incorporating the aforementioned novel curable composition. This method for forming a film is extremely useful in the top-coating and/or repair finish of vehicles.

BACKGROUND ART

Accompanying the recent degradation of the global environment, acid rain has begun to cause damage to the coated surfaces of outdoor structures, vehicles, and the like, such that the development of a composition forming a cured film possessing superior resistance to acid is in great demand.

As the top-coat for vehicles, a curable composition prepared from a hydroxyl group-containing acrylic resin or a hydroxyl group-containing alkyd resin, and an amino resin has been employed; however, the cured film obtained from this composition has displayed an insufficient acid resistance and the like; hence, drastic improvement of this composition is desirable.

In addition, a composition prepared from a hydroxyl group-containing acrylic resin and polyisocyanate compound is currently employed for a variety of uses as a composition curable at room temperatures to yield a cured film possessing a superior acid resistance.

However, this composition has a toxicity problem attributed to the polyisocyanate compound.

As a result, the development of a room temperature curable composition which can produce a film of an extremely high utility possessing superior acid resistance and is free from toxicity problems is currently in high demand.

It is an object of the present invention to provide a curable composition which possesses a superior curability and produces a cured film having excellent properties such as acid resistance and the like.

DISCLOSURE OF THE INVENTION

The inventors of the present invention have commenced intensive research in order to develop a novel composition for baking use which provides a cured film having superior acid resistance, as well as novel isocyanate-free room temperature curable composition which provides superior acid resistance.

As a result, the inventors have achieved their objective and completed the present invention by confirming that a curable composition containing a compound or a polymer having a specific substituted methyl ester group as an essential component possesses extremely high utility and solves the aforementioned problems.

In other words, the present invention basically provides a curable composition incorporating as an essential component a polymer (A) possessing in a molecule both at least one substituted methyl ester group represented by general formula [I],

$$-CO_2CH_2OX \qquad [I]$$

[in the formula, X represents a monovalent organic group] and at least one active hydrogen-containing group and/or epoxy group; or a curable composition incorporating as essential components a compound (C) possessing in a molecule at least two substituted methyl ester groups represented by general formula [I],

$$-CO_2CH_2OX \qquad [I]$$

[in the formula, X represents a monovalent organic group] and a compound (D) possessing in a molecule at least two active hydrogen-containing groups and/or epoxy groups; and furthermore a curable composition incorporating a curing catalyst (B) into both of the aforementioned compositions.

In addition, the present invention also provides a method for forming a film from a liquid paint containing the various curable compositions mentioned above.

The aforementioned polymer (A) employed in the present invention represents a compound possessing in a molecule at least one substituted methyl ester group represented by the aforementioned general formula [I] and at least one active hydrogen-containing group and/or epoxy group. Particularly representative examples of this polymer (A) include vinyl polymers (A-I) and various polymers (A-II) other than vinyl polymers, such as polyester resins, alkyd resins, polyurethane resins, polyether resins and the like.

Among the aforementioned, particularly representative examples of vinyl polymers include various vinyl polymers such as acrylic polymers, vinyl ester polymers, α-olefin polymers, fluoroolefin polymers, chloroolefin polymers and the like. In particular, use of acrylic polymers and fluoroolefin polymers is preferred.

Particularly representative examples of the monovalent organic group to be introduced into the aforementioned polymer (A) represented by means of "X" in the substituted methyl ester group shown by the aforementioned general formula [I] include straight-chain or branched $C_1$–$C_{10}$ alkyl groups; straight-chain or branched $C_1$–$C_{10}$ alkyl groups substituted by a halogen atom, alkoxyl group, cycloalkyl group, aryl group or the like; cycloalkyl groups; cycloalkyl groups substituted by a halogen atom, alkoxyl group, or the like; aryl groups; substituted aryl groups; and the like.

Particularly representative examples of the substituted methyl ester group possessing these monovalent organic groups include methoxymethyl ester group, ethoxymethyl ester group, n-propoxymethyl ester group, isopropoxymethyl ester group, n-butoxymethyl ester group, isobutoxymethyl ester group, 2-ethylhexyloxymethyl ester group, n-octoxymethyl ester group, n-decyloxymethyl ester group, cyclopentyloxymethyl ester group, cyclohexyloxymethyl ester group, phenoxymethyl ester group, p-tolyloxymethyl ester group, benzyloxymethyl ester group, 2-phenylethoxymethyl ester group and the like.

Particularly representative examples of the active hydrogen-containing group to be introduced into aforementioned polymer (A) include a hydroxyl group, an alkoxymethylamino group represented by —NHCH$_2$OR, a methylolamino group represented by —NHCH$_2$OH, a group containing a carboxylic acid amide bond represented by —CO—NH—, a group containing a urethane bond represented by —OCONH—, a group containing a urea bond represented by =N—CONH—, a group containing a 1,3-dicarbonyl group represented by —CO—CH(Y)—CO—Z (wherein, Y represents a hydrogen atom or a monovalent organic group, and Z represents a monovalent organic group), and a group containing a sulfonamide bond represented by —SO$_2$NH—.

Particularly representative examples of the aforementioned group containing a carboxylic acid amide bond represented by —CO—NH— include, in addition to N-non-substituted carboxylic acid amido groups, N-mono-substituted carboxylic acid amido groups such as N-monomethylcarboxylic acid amido group, N-monoethylcarboxylic acid amido group, N-n-butylcarboxylic acid amido group, N-methylolcarboxylic acid amido group, N-alkoxymethylcarboxylic acid amido group, N-(1,1-dimethyl-3-oxobutyl)carboxylic acid amido group and the like; and additionally groups containing a carboxylic acid hydrazide structure.

Particularly representative examples of the aforementioned group containing a urethane bond represented by —OCONH— include, in addition to N-non-substituted carbamyloxy groups, various N-mono-substituted carbamyloxy groups obtained by adding various monoisocyanate compounds to a hydroxyl group represented by N-methylcarbamyloxy group, N-ethylcarbamyloxy group, N-n-butylcarbamyloxy group, N-benzylcarbamyloxy group and the like; O-iminocarbamate groups obtained by adding various ketoxime compounds represented by methyl ethyl ketoxime, methyl isobutyl ketoxime and the like to an isocyanate group; and various carbamate groups obtained by adding various alcohols such as methanol, ethanol, benzyl alcohol and the like to an isocyanate group.

Particularly representative examples of the aforementioned group containing a urea bond. represented by =N—CONH— include, in addition to non-substituted ureido groups such as —NH—CONH$_2$, various N'-mono-substituted ureido groups such as —NH—CONH—CH$_3$, —NH—CONH—C$_2$H$_5$, —HN—CONH—CH$_2$OH, NH—CONH—CH$_2$OR (wherein, R represents an alkyl group), and the like; various N-mono-substituted ureido groups such as —N(CH$_3$)—CONH$_2$, —N(C$_2$H$_5$)—CONH$_2$, —N(CH$_2$OH)—CONH$_2$, and the like; various N,N'-di-substituted ureido groups such as —N(CH$_3$)—CONH—CH$_3$, —H(C$_2$H$_5$)—CONH—C$_2$H$_5$, —N(CH$_2$OH)—CONH—CH$_2$OH, and the like; cyclic urea groups such as ethylene urea group, propylene urea group and the like; or various groups possessing an allophanoyl structure obtained by reacting an isocyanate group and a straight-chain or cyclic carboxyl acid amide; and further groups possessing a semicarbazido structure.

Particularly representative examples of the aforementioned group containing a 1,3-dicarbonyl group represented by —CO—CH(Y)—CO—Z include acetoacetyl group, acetoacetoxy group, acetoacetamido group and the like.

Particularly representative examples of the aforementioned group containing a sulfonamide bond represented by —SO$_2$NH— include, in addition to N-non-substituted sulfonamido groups, N-mono-substituted sulfonamido groups, such as N-methylsulfonamido group, N-ethylsulfonamido group, N-n-propylsulfonamido group, N-methylolsulfonamido group, N-alkoxymethylsulfonamido group and the like.

Among the aforementioned polymers (A), in preparing vinyl polymer (A-I), a method in which radical copolymerization is performed using a vinyl monomer possessing a substituted methyl ester group shown by the aforementioned general formula [I], and a vinyl monomer possessing an active hydrogen-containing group and/or a vinyl monomer possessing an epoxy group, is the simplest method and, in particular, recommended.

The vinyl monomer possessing a substituted methyl ester group shown by the aforementioned general formula [I] can be easily prepared by reacting, for example, a carboxyl group-containing vinyl monomer with a compound shown by the following general formula [II]:

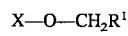   [II]

[in the formula, X is as described above; R$^1$ represents a group such as W—O— (wherein, W can be the same as X, and represents a monovalent organic group), or a halogen atom]; or a compound shown by the following general formula [III]:

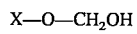   [III]

[in the formula, X is as described above].

Particularly representative examples of compound shown by the aforementioned general formula [II] include dialkoxymethanes, such as dimethoxymethane, diethoxymethane, di-n-propoxymethane, di-n-butoxymethane, dicyclohexyloxymethane, dibenzyloxymethane and the like; halomethyl ethers such as methyl chloromethyl ether, ethyl chloromethyl ether, n-butyl chloromethyl ether, methyl bromomethyl ether, ethyl bromomethyl ether and the like; and various esters of alkoxymethanols derived from formaldehyde and various monovalent alcohols such as methanol, ethanol, n-propanol and the like, and various acids such as carboxylic acid, sulfonic acid, sulfinic acid, inorganic acids and the like.

Particularly representative examples of compound shown by the aforementioned general formula [III] include various alkoxymethanols obtained from formaldehyde or paraformaldehyde, and a monohydroxyl compound represented by X—OH [wherein, in the formula, X is as described above].

Particularly representative examples of the aforementioned alkoxymethanol include methoxymethanol, ethoxymethanol, n-propoxymethanol, n-butoxymethanol, cyclohexyloxymethanol, benzyloxymethanol, and the like.

In preparing a vinyl monomer possessing a substituted methyl ester group from a vinyl monomer possessing a carboxyl group, and a compound shown by the aforementioned general formula [II], or a compound shown by the aforementioned general formula [III], the compound shown by general formula [II], or the compound shown by general formula [III] is added dropwise to the vinyl monomer possessing a carboxyl group under the presence of an acid catalyst, basic catalyst, or acid scavenger, and allowed to react for approximately 1~20 hours at a temperature within the range of 0° C.~130° C.

Particularly representative examples of the acid catalyst to be employed in this case include Lewis acids such as BF$_3$ and ether complexes of the same, titanium tetrachloride, tin dichloride, tin tetrachloride, gallium trichloride, aluminum trichloride, zirconium tetrachloride and the like; various metal salts of trifluomethanesulfonic acid represented by silver trifluoromethanesulfonate, tin trifluoromethanesulfonate and the like; various organic sulfonic acids such as methanesulfonic acid, propanesulfonic acid, toluenesulfonic acid, dodecylbenzenesulfonic acid, naphthalenesulfonic acid, trifluoromethanesulfonic acid, trichloromethanesulfonic acid and the like; various phosphates such as methyl phosphate, isopropyl phosphate, diisopropyl phosphate, tributyl phosphate and the like; esters of organic sulfonic acids such as butyl methanesulfonate, propyl toluenesulfonate, 2-hydroxycyclohexyl toluenesulfonate and the like; various inorganic acids such as hydrochloric acid, sulfuric acid, phosphoric acid, metaphosphoric acid and the like; various solid acids such as resins possessing acid groups such as sulfonic acid group, sulfuric acid group, phosphoric acid group and the like; or various phosphate anhydrides such as phosphorous pentoxide.

In addition, particularly representative examples of compounds to be used as basic catalysts and acid scavengers include inorganic basic compounds such as sodium hydroxide, calcium hydroxide, sodium carbonate and the like, and various tertiary amines such as triethylamine, tri-n-butylamine, dimethylbenzylamine and the like.

It is possible to conduct the aforementioned reactions with or without a solvent. In the case when a solvent is employed, the solvent must be an inactive compound with respect to the vinyl monomer possessing a carboxyl group, the aforementioned compound shown by general formula [II], the aforementioned compound shown by general formula [III], and the acid catalysts.

Particularly representative examples of this solvent include various hydrocarbon solvents such as toluene, xylene, cyclohexane, n-hexane, octane and the like; various ester solvents such as ethyl acetate, butyl acetate and the like; or various ether solvents such as ethylene glycol dimethyl ether, diethylene glycol dimethyl ether and the like.

Particularly representative examples of the vinyl monomer having a substituted methyl ester group of general formula [I] prepared from methacrylic acid include:

$$CH_2=C(CH_3)CO_2CH_2OCH_3 \quad (I\text{-}1\text{-}1)$$

$$CH_2=C(CH_3)CO_2CH_2OC_2H_5 \quad (I\text{-}1\text{-}2)$$

$$CH_2=C(CH_3)CO_2CH_2OC_3H_7 \quad (I\text{-}1\text{-}3)$$

$$CH_2=C(CH_3)CO_2CH_2O\text{-}i\text{-}C_3H_7 \quad (I\text{-}1\text{-}4)$$

$$CH_2=C(CH_3)CO_2CH_2OC_4H_9 \quad (I\text{-}1\text{-}5)$$

$$CH_2=C(CH_3)CO_2CH_2O\text{-}i\text{-}C_4H_9 \quad (I\text{-}1\text{-}6)$$

$$CH_2=C(CH_3)CO_2CH_2OC_6H_{11} \quad (I\text{-}1\text{-}7)$$

$$CH_2=C(CH_3)CO_2CH_2OCH_2C_6H_5 \quad (I\text{-}1\text{-}8)$$

$$CH_2=C(CH_3)CO_2CH_2OC_6H_5 \quad (I\text{-}1\text{-}9)$$

and $$CH_2=C(CH_3)CO_2CH_2O\text{—}C_6H_{10}\text{—}CH_3 \quad (I\text{-}1\text{-}10).$$

When preparing vinyl polymer (A-I), it is needless to say that, in addition to the aforementioned vinyl monomers possessing a substituted methyl ester group derived from methacrylic acid, it is possible to employ various vinyl monomers possessing a substituted methyl ester group derived from vinyl monomers possessing carboxyl groups other than methacrylic acid.

Particularly representative examples of carboxyl group-containing vinyl monomers used for preparing these various vinyl monomers possessing a substituted methyl ester group include various unsaturated monocarboxylic acids such as acrylic acid, crotonic acid, 2-carboxyethyl (meth)acrylate and the like; various monovinyl esters of saturated dicarboxylic acids such as succinic acid, adipic acid, sebacic acid and the like; various unsaturated dicarboxylic acids such as maleic acid, fumaric acid, itaconic acid, and the like; monoesters of an aforementioned unsaturated dicarboxylic acid and a monovalent alcohol; various carboxyl group-containing monomers prepared by reacting a hydroxyl group-containing monomer such as 2-hydroxyethyl (meth)acrylate with a polycarboxylic anhydrides such as succinic anhydride, phthalic anhydride and the like; and further, various unsaturated carboxylic acids obtained by reacting an $\epsilon$-caprolactone with any of the aforementioned unsaturated carboxylic acids.

Among the vinyl monomers having active hydrogen-containing groups to be used for preparing vinyl polymer (A-I), particularly representative examples of a hydroxyl group-containing vinyl monomer include 2-hydroxyethyl (meth)acrylate, 2-hydroxypropyl (meth)acrylate, 4-hydroxybutyl (meth)acrylate, 2-hydroxyethyl vinyl ether, 4-hydroxybutyl vinyl ether, 2-hydroxyethyl allyl ether and the like, in addition to various hydroxyl group-containing vinyl monomers obtained by reacting the aforementioned hydroxyl group-containing vinyl monomers with $\epsilon$-caprolactone.

Particularly representative examples of a vinyl monomer possessing a group containing a carboxylic acid amide bond include (meth)acrylamide, N-methyl(meth)acrylamide, N-ethyl(meth)acrylamide, N-methylol(meth)acrylamide, N-n-butoxymethyl(meth)acrylamide, N-iso-butoxymethyl(meth)acrylamide, N-methoxymethyl(meth)acrylamide, diacetone acrylamide and the like.

Particularly representative examples of a vinyl monomer possessing a group containing a urethane bond include monomers produced by converting the hydroxyl group portion of hydroxyl group-containing vinyl monomers such as those mentioned above to a carbamate group, such as 2-carbamyloxyethyl (meth)acrylate, 4-carbamyloxybutyl (meth)acrylate, 2-carbamyloxyethyl vinyl ether, 4-carbamyloxybutyl vinyl ether, 2-carbamyloxyethyl allyl ether and the like; N-mono-substituted carbamate group-containing vinyl monomers produced by adding a monoisocyanate compound to any of the various hydroxyl group-containing vinyl monomers mentioned above, such as 2-(N-methylcarbamyloxy)ethyl (meth)acrylate, 2-(N-ethylcarbamyloxy)ethyl (meth)acrylate, 4-(N-methylcarbamyloxy)butyl (meth)acrylate, 2-(N-methylcarbamyloxy) ethyl vinyl ether, 4-(N-n-butylcarbamyloxy)butyl vinyl ether, 2-(N-benzylcarbamyloxy)ethyl allyl ether and the like; and vinyl monomers containing a urethane bond produced by adding various alcohols such as methanol, ethanol and the like, or ketoximes such as methyl ethyl ketoxime, methyl isobutyl ketoxime and the like to isocyanate group-containing vinyl monomers, such as 2-isocyanate ethyl (meth)acrylate, vinyl isocyanate, (meth)acryloyl isocyanate, metaisopropenyl-$\alpha$, $\alpha$-dimethylbenzyl isocyanate, and addition reaction products of any of the various hydroxyl group-containing vinyl monomers mentioned above and a diisocyanate compound and the like.

Particularly representative examples of a vinyl monomer possessing a group containing a urea bond include various monomers produced by conducting an addition reaction of any of the aforementioned various isocyanate group-containing vinyl monomers, with various primary amines such as methylamine, ethylamine, n-propylamine, n-butylamine, benzylamine and the like, and with various secondary amines such as dimethylamine, diethylamine, di-n-propylamine, di-n-butylamine and the like, and with various carboxylic acid amides such as acetoamide, N-methylacetamide, 2-pyrrolidone, $\epsilon$-caprolactam and the like, or ammonia; or monomers containing a cyclic urea group such as N-[2-(meth)acryloyloxy]ethylethyleneurea, N-[2-(meth)acryloyloxy]ethylpropyleneurea and the like.

Particularly representative examples of a vinyl monomer possessing a group containing a 1,3-dicarbonyl group include various monomers formed by reacting diketene with any of the aforementioned various hydroxyl group-containing vinyl monomers such as 2-acetoacetoxyethyl (meth)acrylate, 2-acetoacetoxypropyl (meth)acrylate, 4-acetoacetoxybutyl (meth)acrylate, 2-acetoacetoxyethyl vinyl ether, 4-acetoacetoxybutyl vinyl ether, 2-acetoacetoxyethyl allyl ether and the like; and various acetoacetamido group-containing monomers such as N-vinylacetoacetamide, N-allylacetoacetamide and the like.

Particularly representative examples of a vinyl monomer containing a sulfonamide bond such as —$SO_2NH$— include various monomers containing N-non-substituted sulfonamide bonds such as p-styrenesulfonamide, vinylsulfonamide and the like; and various monomers containing N-monosubstituted sulfonamide bonds such as N-methyl-p-styrenesulfonamide, N-ethyl-p-styrenesulfonamide, N-n-propyl-p-styrenesulfonamide, N-methylol-p-styrenesulfonamide, N-alkoxymethyl-p-styrenesulfonamide, N-methylvinylsulfonamide, N-ethylvinylsulfonamide and the like.

Particularly representative examples of epoxy group-containing vinyl monomers include glycidyl (meth)acrylate, 2-methylglycidyl (meth)acrylate, 3,4-epoxycyclohexylmethyl (meth)acrylate, diglycidyl fumarate, diglycidyl maleate, diglycidyl itaconate, glycidyl vinyl ether, vinylcyclohexene oxide and the like.

Particularly representative examples of other monomers which are capable of being copolymerized with the aforementioned substituted methyl ester group-containing vinyl monomers, vinyl monomers having an active hydrogen-containing group, and/or epoxy group-containing vinyl monomers include various $C_1$~$C_{22}$ alkyl (meth)acrylates such as methyl (meth)acrylate, ethyl (meth)acrylate, butyl (meth)acrylate, 2-ethylhexyl (meth)acrylate, lauryl (meth)acrylate and the like; various alicyclic alkyl (meth)acrylates such as cyclopentyl (meth)acrylate, cyclohexyl (meth)acrylate, isobornyl (meth)acrylate and the like; various aralkyl (meth)acrylates such as benzyl (meth)acrylate, 2-phenylethyl (meth)acrylate, and the like; various alkyl esters of crotonic acid such as methyl crotonate, ethyl crotonate and the like; various dialkyl esters of unsaturated dicarboxylic acids such as dimethyl maleate, dibutyl maleate, dimethyl fumarate, dibutyl fumarate, dimethyl itaconate, dibutyl itaconate and the like; various aromatic vinyl monomers such as styrene, p-tert-butylstyrene, α-methylstyrene, vinyltoluene and the like; various cyano group-containing monomers such as (meth)acrylonitrile, crotononitrile and the like; various fluoroolefins such as vinyl fluoride, vinylidene fluoride, tetrafluoroethylene, chlorotrifluoroethylene, hexafluoropropylene, and the like; various chloroolefins such as vinyl chloride, vinylidene chloride, and the like; various α-olefins such as ethylene, propylene, isobutylene, 1-butene and the like; various vinyl esters of carboxylic acids such as vinyl acetate, vinyl propionate, vinyl pivalate, vinyl versate, and the like; various alkoxyalkyl (meth)acrylates such as 2-methoxyethyl (meth)acrylate, 2-ethoxyethyl (meth)acrylate, 1-methoxyethyl (meth)acrylate, 1-ethoxyethyl (meth)acrylate, and the like; various unsaturated monobasic acids such as (meth)acrylic acid, crotonic acid, 2-carboxyethyl (meth)acrylate, and the like; various monovinyl esters of various saturated dicarboxylic acids such as succinic acid, adipic acid, sebacic acid and the like; various unsaturated dicarboxylic acids such as maleic acid, fumaric acid, itaconic acid and the like; monoesters of any of the aforementioned unsaturated dicarboxylic acids and monovalent alcohols; various carboxyl group-containing monomers obtained by reacting a using hydroxyl group-containing monomer represented by 2-hydroxyethyl (meth)acrylate and the like, with various polycarboxylic acid anhydrides such as succinic anhydride, phthalic anhydride and the like; various monomers possessing acid groups other than carboxyl groups such as 2-phosphonooxyethyl (meth)acrylate, vinylsulfonic acid, allylsulfonic acid and the like; and further various alkyl and cycloalkyl vinyl ethers such as ethyl vinyl ether, n-butyl vinyl ether, isobutyl vinyl ether, cyclohexyl vinyl ether and the like.

In preparing vinyl polymer (A-I) to be employed in the present invention, it is also possible to use when necessary other copolymerizable vinyl monomers, in addition to the aforementioned substituted methyl ester group-containing vinyl monomers, vinyl monomers having an active hydrogen-containing group, and/or epoxy group-containing vinyl monomers, by applying any conventionally known polymerization method.

In other words, it is possible to prepare the desired vinyl polymer (A-I) by means of radical polymerization according to a conventional process such as solution polymerization, non-aqueous dispersion polymerization, bulk polymerization and the like. In particular, preparation according to solution radical polymerization serves as the simplest method.

Particularly representative examples of the solvent to be employed in solution radical polymerization include various hydrocarbon solvents such as toluene, xylene, cyclohexane, n-hexane, n-octane, and the like; various ester solvents such as methyl acetate, butyl acetate, amyl acetate, ethyl 3-ethoxypropionate, 2-ethoxyethyl acetate and the like; ketone solvents such as methyl ethyl ketone, methyl isobutyl ketone, methyl amyl ketone, cyclohexanone and the like; and various ether solvents such as di-n-butyl ether, diethylene glycol diethyl ether, 1,2-diethoxyethane, 1,2-dimethoxyethane, dimethoxymethane and the like. Needless to say these solvents may be used independently or in combinations of two or more.

Furthermore, particularly representative examples of the radical polymerization initiator include azo initiators represented by azobisiso nitrile and the like; or peroxide initiators represented by benzoyl peroxide and the like. In addition, it is also possible to employ conventionally known initiator systems such as mixtures of both of the aforementioned types of initiators.

Additionally, when necessary, various chain transfer agents such as lauryl mercaptan, octyl mercaptan, 2-mercaptoethanol, octyl thioglycolate, 3-mercaptopropionic acid, α-methylstyrene dimers and the like, may be employed for controlling molecular weight.

With regard to the equivalent ratio of the substituted methyl ester group, and the active hydrogen-containing group and/or epoxy group to be introduced into the vinyl polymer (A-I) prepared as described above, in consideration of the curability, the ratio of the former to latter is appropriately set within the range of 1:0.1~1:10, and preferably in the range of 1:0.2~1:5.

In addition, with regard to the introduction amount of each respective functional group into the aforementioned vinyl polymer (A-I), the total amount of the substituted methyl ester group, and active hydrogen-containing group and/or epoxy group is appropriately within the range of 100 mmol~8.7 mol, and preferably within the range of 300 mmol~8.7 mol per 1,000 g of the polymer solids.

Furthermore, the number average molecular weight of vinyl polymers (A-I) is appropriately within the range of 300–300,000, preferably within the range of 500–100,000, and more preferably within the range of 700–50,000.

Various conventionally-prepared polymers such as a polyester resin, an alkyd resin, a polyurethane resin, a polyether resin and the like, having at least two carboxyl groups in a molecule, can be used as the starting material for the preparation of polymer (A-11) to be used in the present invention by introducing both a substituted methyl ester group of general formula [I] and an active hydrogen-containing group and/or an epoxy group into those polymers.

Initially, a carboxyl group-containing polymer is reacted with a compound of general formula [II] or a compound of general formula [III] in the aforementioned manner to produce a polymer (hereinafter referred to as "polymer (a)") possessing both at least one substituted methyl ester group and at least one carboxyl group in each molecule.

Subsequently, the desired polymer (A-11) can be then prepared by introducing an active hydrogen-containing group and/or an epoxy group into the polymer(s) according to the modification method as exemplified below.

Subsequently, the desired polymer (A-II) can be then prepared by means of conducting, for example, the following denaturing process on this polymer (a) and introducing an active hydrogen-containing group and/or epoxy group.

A polymer (A-II) possessing both a substituted methyl ester group and hydroxyl group can be prepared by means of reacting the aforementioned polymer (a) with a monoepoxy compound or diepoxy compound and the like, to convert the carboxyl group in this polymer (a) into a hydroxyl group.

A polymer (A-II) possessing both a substituted methyl ester group and a group containing a carboxylic acid amide bond can be prepared by reacting a monoisocyanate compound, diisocyanate compound or the like with the aforementioned polymer (a), to convert the carboxyl group in this polymer (a) into an amido group.

A polymer (A-II) possessing both a substituted methyl ester group and a 1,3-dicarbonyl group-containing group can be prepared by reacting a monoepoxy compound, diepoxy compound or the like with the aforementioned polymer (a) to convert the carboxyl group in this polymer (a) into a hydroxyl group, followed by the addition of diketene to convert the hydroxyl group into an acetoacetoxy.

A polymer (A-II) possessing both a substituted methyl ester group and a group containing a urea bond can be prepared by reacting a diisocyanate compound with the aforementioned polymer (a) such that the isocyanate groups are in excess with respect to the carboxyl groups, followed by the reaction of a primary amine, secondary amine, or ammonia to convert the excess isocyanate groups into ureido groups.

A polymer (A-II) possessing both a substituted methyl ester group and a group containing a urethane bond can be prepared by reacting a diisocyanate compound with the aforementioned polymer (a) in a manner such that the isocyanate groups are in excess with respect to the carboxyl groups, followed by the reaction of an alcohol to convert the excess isocyanate groups into carbamate groups.

In preparing the aforementioned polymer (A-II) possessing both a methyl ester group and epoxy group, a diepoxy compound is reacted with the aforementioned polymer (a) in a ratio such that the epoxy groups are in excess with respect to the carboxyl groups.

The number average molecular weight of the polymer (A-II) prepared in this manner is appropriately within the range of 300–50,000, preferably within the range of 500–30,000, and more preferably within the range of 500–20,000.

In addition, as the aforementioned polymer (A) component, it is possible to use a block copolymer or a graft copolymer possessing both a vinyl polymer segment, and a polymer segment other than a vinyl polymer segment such as a polyurethane segment, polyurea segment, polyamide segment, or the like.

Since in the case of this block and/or graft copolymer; various active hydrogen-containing groups such as a urethane bond, urea bond, amide bond or the like are contained in the main chain of the polymer segment other than the vinyl polymer segment, the preparation of this block or graft copolymer as the (A) component is accomplished by introducing only a substituted methyl ester group into the vinyl polymer segment.

The aforementioned compound (C) to be used in the present invention represents a compound containing at least two substituted methyl ester groups shown by the aforementioned general formula [I] in a molecule.

Particularly representative examples of this compound (C) include a low-molecular weight compound (C-I) containing at least two substituted methyl ester group derived from a polycarboxylic acid such as dicarboxylic acid, tricarboxylic acid, tetracarboxylic acid, and the like; a vinyl polymer (C-II) containing at least two of the aforementioned substituted methyl ester groups in a molecule; or a polymer (C-III) other than a vinyl polymer, containing at least two of the aforementioned substituted methyl ester groups in a molecule, such as polyester resin, alkyd resin, polyether resin, and the like.

Among the aforementioned compound (C), the low molecular weight compound (C-I) can be prepared by reacting a compound shown by the aforementioned general formula [II] or [III] with a polycarboxylic acid as described above.

Particularly representative examples of the polycarboxylic acid to be employed for the preparation of compound (C-1) include various dicarboxylic acids such as succinic acid, oxalic acid, adipic acid, sebacic acid, fumaric acid, maleic acid, itaconic acid, phthalic acid, terephthalic acid, dimer acid, and reaction products of maleic anhydride or succinic anhydride, with an oxy-acid; various tricarboxylic acids represented by propane-1,2,3-tricarboxylic acid, trimellitic acid and the like; and various tetracarboxylic acids represented by butane-1,2,3,4-tetracarboxylic acid, pyromellitic acid and the like.

Particularly representative examples of the thus-obtained compound (C-I) include bismethoxymethyl adipate, bis-n-butoxymethyl succinate, trisethoxymethyl propane-1,2,3-tricarboxylate, tetrakismethoxymethyl butane-1,2,3,4-tetracarboxylate and the like.

Particularly representative examples of the vinyl polymer (C-II) include various vinyl polymers such as acrylic polymers, vinyl ester polymers, α-olefin polymers, fluoroolefin polymers, chloroolefin polymers and the like. Among the aforementioned vinyl polymers, acrylic polymers and fluoroolefin polymers are, in particular, preferred.

The preparation of this vinyl polymer (C-11) can be achieved by various methods such as homopolymerization of a substituted methyl ester group-containing vinyl monomer as described above, copolymerization of the substituted methyl ester group-containing vinyl monomer with another copolymerizable vinyl monomer, and the reaction of a vinyl polymer containing at least two carboxyl groups with a compound of general formula [I] or a compound of general formula {II].

In addition, the aforementioned polymer (C-III) can be prepared by reacting, as explained above, a compound shown by the aforementioned general formula [II] or general formula [III] with a polymer containing at least two carboxyl groups in a molecule, such as a polyester resin, alkyd resin, polyether resin or the like, to convert the carboxyl groups into substituted methyl ester groups.

The number average molecular weight of the vinyl polymer (C-II) prepared in this manner is appropriately within the range of 300~300,000, preferably within the range of 500~100,000, and more preferably within the range of 700~50,000.

Additionally, with regard to the introduction amount of the functional group, 100 mmol~8.7 mol, preferably 300 mmol~8.7 mol of the aforementioned substituted methyl ester group is appropriate per 1,000 grams of the polymer (C-II) solids.

The number average molecular weight of the aforementioned polymer (C-III) is appropriately within the range of 300~50,000, preferably within the range of 500~30,000, and more preferably within the range of 700~20,000.

As the compound (C), compounds possessing additionally an active hydrogen-containing group and/or an epoxy group, as mentioned above, can also be employed. In the case when this aforementioned (C) component possessing additionally an active hydrogen-containing group and/or an epoxy group is itself a polymer, this (C) component is basically identical to the aforementioned polymer (A). This means that the (A) component can also be used in combination with the (D) component.

The aforementioned compound (D) to be used in the present invention indicates a compound possessing at least two of the above-mentioned active hydrogen-containing groups and/or an epoxy groups in a molecule.

As this aforementioned compound (D), in addition to a comparatively low-molecular weight compound (D-I) possessing an active hydrogen-containing group and/or an epoxy group, a vinyl polymer (D-II) possessing the aforementioned functional group(s), as well as various polymers (D-III) other than vinyl polymers can be employed.

Among the aforementioned compound (D), particularly representative examples of this vinyl polymer (D-II) include acrylic polymers, vinyl ester polymers, α-olefin polymers, fluoroolefin polymers, chloroolefin polymers and the like. Among these polymers, acrylic polymers and fluoroolefin polymers are, in particular, preferred.

These vinyl polymers (D-II) can be easily prepared by radical polymerization of various vinyl monomers possessing an active hydrogen-containing group and/or an epoxy group, as exemplified for preparing the vinyl polymer (A-I), or by radical polymerization of a mixture of those monomers with another copolymerizable vinyl monomer according to the same process described above. Particularly representative examples of another copolymerizable vinyl monomer to be used at this time include the aforementioned compounds used for the preparation of the vinyl polymer (A-I).

In addition, it is needless to say that among the aforementioned vinyl polymers (D-II), polymers possessing a group containing a urethane bond can be prepared by various methods such as the reaction of a hydroxyl group-containing vinyl polymer with a compound selected fro a monoisocyanate, a blocked monoisocyanate, and a urea compound, and the reaction of an alcohol or a ketoxime compound with an isocyanate group-containing vinyl polymer obtained by polymerizing the aforementioned isocyanate group-containing monomer.

Among vinyl polymers (D-II), polymers possessing a group containing a urea bond can be prepared by the reaction of an isocyanate group containing vinyl polymer with a primary or secondary amine, ammonia, or a carboxylic acid amide.

Among vinyl polymers (D-II), polymers having a 1,3-dicarbonyl group can be prepared by the reaction of a hydroxyl group-containing vinyl polymer with diketene.

The number average molecular weight of the vinyl polymer (D-II) prepared in this manner is appropriately within the range of 300~300,000, preferably within the range of 500~100,000, and more preferably within the range of 700~50,000.

The introduction amount of the active hydrogen-containing group and/or epoxy group is appropriately within the range of 100 mmol~8.7 mol, and preferably within the range of 300 mmol~8.7 mol per 1,000 grams of (D-II) solids.

Among the comparatively low molecular weight compounds (D-I), particularly representative examples of compounds possessing hydroxyl groups include various alkane diols such as ethylene glycol, propane-1,2-diol, propane-1,3-diol, butane-1,4-diol, hexane-1,6-diol and the like; various cycloalkane diols such as cyclohexane-1,2-diol, 4-methylcyclohexane-1,2-diol, 1,4-bishydroxymethylcyclohexane and the like; various aromatic diols such as bisphenol A, bisphenol F and the like; various triols such as by trimethylol propane, trimethylol ethane and the like; and various tetraols as represented by pentaerythritol and the like.

Among (D-I), particularly representative examples of compounds possessing a group containing a carboxylic acid amide bond include N-non-substituted and N-mono-substituted amide compounds derived from various polycarboxylic acids as exemplified for preparing the aforementioned compound (C-I).

Among (D-I), particularly representative examples of compounds possessing a group containing a urethane bond include various urethane bond-containing low-molecular weight compounds such as reaction products of the aforementioned polyols with monoisocyanate compounds; or reaction products of various polyisocyanate compounds such as diisocyanate, triisocyanate, isocyanate prepolymers and the like, with alcohols or ketoxime compounds.

Among (D-I), particularly representative examples of compounds possessing a group containing a urea bond include reaction products of various polyisocyanates such as diisocyanate, triisocyanate and the like, with primary or secondary amines, ammonia, or carboxylic acid amide compounds; reaction products of polyamine compounds with monoisocyanate compounds; and various urea resins obtained from the reaction of urea and formaldehyde, or from the reaction of urea, formaldehyde, and alkyl alcohols.

Among (D-I), particularly representative examples of compounds possessing a group containing 1,3-dicarbonyl group(s) include various polyacetoacetoxy compounds obtained by reacting any of the aforementioned polyols with diketene; or various polyacetoacetamide compounds obtained by reacting various polyamine compounds such as 1,4-tetramethylenediamine, 1,6-hexamethylenediamine and the like with diketene.

Among (D-I), particularly representative examples of epoxy group-containing compounds include various polyglycidyl ethers of various polyols as mentioned above, various polyglycidyl esters of various polycarboxylic acids as mentioned above, and further various alicylic polyepoxy compounds such as bis(3,4-epoxycyclohexylmethyl) adipate, 3,4-epoxycyclohexylmethyl 3,4-epoxycyclohexylcarboxylate, tetrakis(3,4-epoxycyclohexylmethyl) butane-1,2,3,4-tetracarboxylate and the like.

Among polymers (D-III) other than vinyl polymers, particularly representative examples of hydroxyl group-containing polymers include various resins such as polyester resins, alkyd resins, polyurethane resins, epoxy ester resins, polyether resins and the like; and various cellulose derivatives such as cellulose acetate butyrate, nitrocellulose and the like. These hydroxyl group-containing polymers can be easily prepared by conventional methods.

Among polymers (D-III) other than vinyl polymers, particularly representative examples of polymers possessing a group containing a carboxylic acid amido group include polyamide resins, polyester resins, polyurethane resins, polyether resins and the like. These polymers can be prepared by applying various methods such as the reaction of a monocarboxylic acid with an isocyanate group-containing polymer and the reaction of a monoisocyanate compound with various carboxyl group-containing polymers.

Among polymers (D-III) other than vinyl polymers, particularly representative examples of polymers possessing a group containing a urethane bond include polyester resins, polyurethane resins, epoxy ester resins, polyether resins and the like. These polymers can be prepared by reacting various hydroxyl group-containing polymers with monoisocyanate compounds or urea compounds, or by reacting an isocyanate group-containing polymer with alcohols and/or ketoxime compounds.

Among polymers (D-III) other than vinyl polymers, particularly representative examples of polymers possessing a group containing a urea bond include polyester resins, alkyd resins, polyurethane resins, polyether resins and the like. Reacting isocyanate group-containing polymers with primary or secondary amines, ammonia, carboxylic acid amide compounds is the simplest method for preparing these polymers.

Among polymers (D-III) other than vinyl polymers, particularly representative examples of polymers possessing a group containing 1,3-dicarbonyl group(s) include polyester resins, alkyd resins, polyurethane resins, polyether resins and the like. Reacting a hydroxyl group-containing polymer with diketene thereby converting to an acetoacetoxy group-containing polymer is the simplest method for preparing these polymers.

Among polymers (D-III) other than vinyl polymers, particularly representative examples of epoxy group-containing polymers include polyester resins, polyurethane resins, polyether resins, epoxy resins and the like.

The simplest method for preparing polymers (D) possessing epoxy groups such as polyester resins, polyurethane resins, polyether resins and the like is the reaction of glycidol with an isocyanate group-containing polymer.

In addition, particularly representative examples of an epoxy resin include the reaction products of various aromatic polyhydroxyl compounds such as bisphenol A, bisphenol F, bisphenol S and the like, and various epihalohydrins such as epichlorohydrin, 2-methylepichlorohydrin and the like.

The number average molecular weight of the aforementioned polymer (D-III) prepared in this manner is appropriately within the range of 300–50,000, preferably within the range of 500–30,000, and more preferably within the range of 500–20,000.

Particularly representative examples of compounds (D) containing a methylolamino group include various amino resins containing methylolamino groups obtained by reacting various amino triazine compounds such as melamine, benzoguanamine, acetoguanamine and the like, with formaldehyde.

Particularly representative examples of compounds (D) containing an alkoxymethylamino group include alkoxymethylated compounds of various polyamine compounds such as 1,4-tetramethylenediamine, 1,6-hexamethylenediamine and the like; and various amino resins obtained by reacting an aminotriazine compound such as melamine, benzoguanamine, acetoguanamine and the like, with formaldehyde and a lower alkyl alcohol.

The (D) component concretely described above possesses only one type of active hydrogen-containing group or epoxy group. However, the aforementioned (D) component includes a compound possessing two or more different types of active hydrogen-containing groups, or a compound possessing both an active hydrogen-containing group and an epoxy group. These compounds are also preferably used.

Among these compounds (D) possessing two or more different types of active hydrogen-containing groups, or possessing both an active hydrogen-containing group and an epoxy group, a vinyl polymer can be easily prepared, according to the above-described process, by radical polymerization of a monomer mixture comprising, as essential components, two or more different types of the aforementioned vinyl monomers possessing active hydrogen-containing groups exemplified for preparing the polymer (A); or by radical polymerization of a monomer mixture comprising, as essential components, at least one type of a vinyl monomer possessing an active hydrogen-containing group, and an epoxy group-containing vinyl monomer.

Among these compounds (D) possessing two or more different types of active hydrogen-containing groups, or jointly possessing both an active hydrogen-containing group and an epoxy group, a polymer other than a vinyl polymer can be prepared by means of combining the aforementioned introduction methods for various functional groups depending on the type of polymer, and type of functional group to be introduced.

In addition, as compound (D), compounds possessing additionally the substituted methyl ester group shown by general formula [I] can also be used. In the case when the (D) component possessing additionally, the aforementioned substituted methyl ester group is itself a polymer, the (D) component is basically identical to the aforementioned polymer (A). This essentially means that this (A) component can also be used in combination with the (C) component.

Additionally, a polymer having active hydrogen-containing groups such as carboxylic acid amide bonds, urethane bonds and the like in the polymer main chain can be used as the polymer (D) component without introducing additionally active hydrogen-containing groups and/or epoxy groups. Examples of such polymer are polyamide resins and polyurethane resins.

The aforementioned curing catalyst (B) to be used in the present invention is a compound which promotes the reaction between the substituted methyl ester group, and active hydrogen-containing group or epoxy group. Particularly representative examples of curing catalyst (b) include various Lewis acids such as $BF_3$ and ether complexes of the same, titanium tetrachloride, tin dichloride, tin tetrachloride, gallium trichloride, aluminum trichloride, zirconium tetrachloride and the like; various metal salts of trifluoromethane sulfonic acid represented by silver trifluoromethane sulfonate, tin trifluoromethane sulfonate and the like; various organic sulfonic acids such as methanesulfonic acid, propanesulfonic acid, toluenesulfonic acid, dodecylbenzenesulfonic acid, naphthalenesulfonic acid, trifluoromethanesulfonic acid, trichloromethanesulfonic acid and the like; various organic sulfinic acids such as 1-butanesulfinic acid, benzenesulfinic acid, p-toluenesulfinic acid and the like; various acidic phosphoric acid esters such as monomethyl phosphate, monoisopropyl phosphate, diisopropyl phosphate and the like; various acidic phosphonic acid esters such as monomethyl phosphonate, monoethyl phosphonate, mono-n-butyl phosphonate and the like; various esters of the aforementioned organic sulfonic acids such as butyl methanesulfonate, propyl toluenesulfonate, 2-hydroxycyclohexyl toluenesulfonate and the like; halocarboxylic acids and derivatives of the same such as dichloroacetic acid, trichloroacetic acid, trifluoroacetic acid, 3,4,5,6-tetrachlorophthalic acid, monoalkyl esters of 3,4,5,6-tetrachlorophthalic acid, 3,4,5,6-tetrachlorophthalic anhydride, and the like; various silanol compounds such as trimethylsilanol, phenyldimethylsilanol, triphenylsilanol, and the like; various compounds generating silanol compounds by hydrolysis such as methyldimethoxysilane, methyltriethoxysilane, phenyldimethoxysilane, triphenylmethoxysilane, triphenylethoxysilane, triphenylisopropoxysilane, methyltrichlorosilane, phenyltrichlorosilane, triphenylchlorosilane, and the like; various metal chelate compounds such as aluminum tris(acetylacetonate), zirconium tris(acetylacetonate), aluminum tris(ethylacetoacetate), zirconium tris(ethylacetoacetate) and the like; catalyst mixture comprising the aforementioned silanol compounds or compounds yielding silanol compounds by hydrolysis, and the aforementioned metal chelate compounds; various inorganic acids such as hydrochloric acid, sulfuric acid, phosphoric acid, metaphosphoric acid, pyrophosphoric acid, phosphonic acid and the like; various organic amines such as 1,8-diazabicyclo[5.4.0]undecene-7 (DBU), 1,5-diazabicyclo[4.3.0]nonene-5 (DBN), 1,4-diazabicyclo[2.2.2]octane (DABCO), triethylamine, N-methylpiperidine, N-methylmorpholine, 2-dimethylaminoethanol, diethylamine, 2-aminoethanol and the like; various salts obtained from the aforementioned various acids and organic amines; various quaternary ammonium salts, having $BF_4$, $PF_6$, $SbF_6$ or the like as a counter anion, such as tetramethylammonium salt, tetraethylammonium salt, trimethyl(2-hydroxypropyl)ammonium salt, tetrabutylammonium salt, tetrakis(hydroxymethyl)ammonium salt, cyclohexyltrimethylammonium salt, o-trifluoromethylphenyltrimethylammonium salt, and the like; various quaternary phosphonium salts, having $BF_4$, $PF_6$, $SbF_6$ or the like as a counter anion, such as tetramethylphosphonium salt, tetraethylphosphonium salt, tetra-n-propylphosphonium salt, tetra-n-butylposphonium salt, trimethyl(2-hydroxypropyl)phosphonium salt, benzyltriphenylphosphonium salt, and the like; and various sulfonium phosphorus salts, having $BF_4$, $PF_6$, $SbF_6$ or the like as a counter anion, such as benzyldimethylsulfonium salt, benzyltetramethylene sulfonium salt, 2-butenyltetramethylene sulfonium salt and the like.

Among the aforementioned compounds, from the point of view of catalytic effect, particularly preferable compounds include various protonic acids such as organic sulfonic acids, halocarboxylic acids, and acidic phosphorus compounds having a hydroxyl group bonded to a phosphorus atom exemplified by phosphoric acid, phosphonic acid, pyrophosphoric acid, metaphosphoric acid, acidic phosphoric acid esters, acidic phosphonic acid esters and the like; salts of aforementioned protonic acids; catalyst mixtures comprising silanol group-containing compounds or silicon compounds generating silanol groups by hydrolysis, and the aforementioned metal chelate compounds; and onium salts generating cationic species upon heating selected from quaternary ammonium salts, quaternary phosphonium salts and sulfonium salts.

The aforementioned polymers (A) possess two types of functional groups which reciprocally react, and hence it is needless to say that these polymers can be used as resins. In addition, a low temperature-curable composition can be obtained by blending the polymers (A) with the above-described various curing catalysts (B).

When the curable composition of the present invention is prepared from compound (C) and compound (D), they are mixed in a manner such that the equivalent ratio of the substituted methyl ester groups attached to (C) to the active hydrogen-containing group and/or the epoxy group attached to (D) is within the range of 1:0.1~1:10, and preferably within the range of 1:0.2~1:5.

By adding various curing catalysts (B) to the thus-obtained composition from compound (C) and compound (D), a lower temperature-curable composition can be obtained.

When curing catalyst (B) is blended with polymer (A) or with the composition prepared from compound (C) and compound (D), (B) is blended in a manner such that the equivalent amount of catalytically active groups in (B) falls within the range of 300 μmol~60 mmol, and preferably within the range of 350 μmol~50 mmol per 100 grams solids of (A), and per 100 grams of total solids of (C) and (D), respectively.

In addition, in the case of preparing a curable composition of the present invention from compound (C) and compound (D), it is, in particular, preferable that either (C) or (D) be a polymer. When both (C) and (D) are low-molecular weight compounds, either (C) or (D) preferably possesses at least three reactive functional groups per molecule.

The curable composition of the present invention prepared in the above-described manner can be used as a clear composition without blending additive. Furthermore, this curable composition can be used as a colored composition by blending conventionally used additives such as pigments, fillers and the like.

Particularly representative examples of pigments to be used for preparing a coloring composition include various inorganic pigments such as titanium oxide, iron oxide, aluminum flakes, mica coated with titanium oxide, and the like; and various organic pigments such as carbon black, Phthalocyanine Blue, Phthalocyanine Green, Quinacridone Red and the like.

Furthermore, when necessary, various conventionally used additives such as a leveling agent, UV-absorbers, antioxidant, pigment dispersing agent, and the like can be blended into the curable composition of the present invention.

The curable composition of the present invention can be utilized in various states such as a solventless liquid, organic solvent solution, organic solvent, solventless solid or solventless powder, depending on the application fields.

In addition, the curable composition of the present invention can be utilized for powder coatings. When the composition is used for powder coatings, it is necessary to design a polymer or a low-molecular weight compound used as the essential component in the composition so as to possess a softening point or a melting point suitable for the application.

When the curable composition of the present invention is used without adding a curing catalyst (B), a sufficiently cured material can be obtained possessing excellent acid resistance by baking for a time ranging from approximately 30 seconds to 2 hours, at a temperature ranging from approximately 120° C. to 250° C., depending on the type of the functional group and the amount of functional groups incorporated into polymer (A) or the composition prepared from compound (C) and compound (D).

When the curable composition of the present invention contains curing catalyst (B), a sufficiently cured material can be obtained possessing excellent acid resistance by baking for a time ranging from approximately 30 seconds to 2 hours, at a temperature ranging from approximately 50° C. to 250° C., depending on the type of the functional group and the amount of functional group incorporated into polymer (A) or into the composition prepared from compound (C) and compound (D), and on the amount of catalyst.

Furthermore, by adding a protonic acid as the curing catalyst (B) to a composition of the present invention, the composition can be cured even at room temperature. Thus, the composition containing a protonic acid gives a sufficiently cured film having excellent acid resistance by curing at room temperature for 1 to 7 days.

The curable composition according to the present invention can also be used as sealing agents, adhesives and the like, in addition to being employed for paints used for metal coatings such as automotive top coats, automotive repair finish, coil coats and the like, and in paints used for various materials such as plastics, concrete, inorganic construction material, glass, paper, textiles and the like.

As a method for forming a film suitable for use in automotive top coats and in automotive repair finish, the present invention further provides a method for forming a film in which after a paint for the base coat containing a pigment is applied to the substrate to be coated, a liquid paint for the top coat, containing a composition of the present invention, i.e., a composition containing the (A) component, a composition containing both the (A) and (B) components, a composition containing both the (C) and (D) components, or a composition containing three components (C), (D) and (B), is coated on the base coat, and then at least the top coat is cured.

As the aforementioned paint for base coat, any conventionally-used paints such as organic solvent solution-type paints, organic solvent dispersion-type paints, and water-borne-type paints, can be used.

Among these types of paints, representative examples of organic solvent solution-type paints and organic solvent dispersion-type paints include acrylic-urethane paints prepared from a hydroxyl group-containing acrylic resin and a polyisocyanate compound; acrylic-melamine paints prepared from a hydroxyl group-containing acrylic resin and a melamine resin; paints based on a cellulose acetate butyrate-modified acrylic resin; and further paints containing the various compositions of the present invention. Representative examples of water-borne-type paints include paints containing acrylic resin aqueous emulsions and paints containing aqueous polyurethane dispersions. These paints for base coat are used with the above-described inorganic pigments and/or organic pigments added therein.

Any of the aforementioned various compositions of the present invention can be employed as material for the top coat. As the paint for the top coat prepared from each of the aforementioned compositions, a so-called clear paint which does not contain any pigments is mainly employed. However, if necessary, it is also possible to blend a pigment of approximately 3% or less of the solids of the film forming component in the clear paint.

In the multi-layer film to be formed in this manner, the thickness of the base coat layer is appropriately within the range of 5~50 microns (μm), and preferably within the range of 10μ30 microns (μm); the thickness of the top coat layer is appropriately within the range of 10~100 μm, and preferably within the range of 15~60 μm.

In order to form a film from these paints, immediately after coating the paint for the base coat onto the substrate to be coated by a conventionally used coating method such as an air spray method, airless spray method or the like, or after allowing the base coat layer to stand at a temperature ranging from room temperature to approximately 100° C. for a few minutes to 1 day, the paint for the top coat is coated on the base coat by means of the aforementioned coating method.

In order to cure a multi-layer film formed in the above-described manner, various conditions, from drying at room temperature to baking at high temperatures, are applied depending on the types of paints for the base coat and top coat.

When the paint for the base coat is a non-crosslinking type paint, and the paint for the top coat is curable at temperature, after coating the paint for the top coat, it is possible to cure the top coat layer by either drying at room temperature or baking.

When the paint for the base coat and the paint for the top coat are both curable at room temperature, after coating the paint for the top coat, it is possible to simultaneously cure the base coat layer and the top coat layer by either drying at room temperature or baking.

When either the paint for the base coat or the paint for the top coat is thermally curable, after coating the paint for the top coat, it is possible to simultaneously cure the base coat layer and the top coat layer by baking.

The cured film formed in this manner possesses, in particular, an extremely superior acid resistance, and thus possesses an extremely high utility for use in the automotive top coats, automotive repair finishes, and the like.

PREFERRED EMBODIMENT FOR EXECUTING THE INVENTION

In the following, the present invention will be explained by means of the Reference Examples, Examples and Comparative Example. However, the present invention is not limited to just these examples. Furthermore, in the following, the terms "parts" and "%" do not impart any particular limitations, and refer to the parts by weight standard.

REFERENCE EXAMPLE 1

[Preparation of polymer (A) possessing both a substituted methyl ester group and hydroxyl group]

160 parts of xylene were placed in a reaction vessel equipped with a thermometer, a reflux condenser, an agitator, a dropping funnel and a nitrogen gas inlet tube, and the temperature of the xylene was raised to 100° C. under a nitrogen atmosphere.

Subsequently, at the same temperature, a mixture of 18 parts of styrene (ST), 74 parts of n-butyl methacrylate (BMA), 38 parts of n-butyl acrylate (BA), 35 parts of methoxymethyl methacrylate (MMMA), 35 parts of 2-hydroxyethyl methacrylate (HEMA), 4 parts of tert-butyl peroxyoctanoate (TBO), 1 part of tert-butyl peroxybenzoate (TBZ) and 40 parts of xylene was added dropwise over the course of 5 hours.

After completion of the dropwise addition, the mixture was maintained at the same temperature for 15 hours to produce a solution of an acrylic polymer possessing both a substituted methyl ester group and a hydroxyl group, with a nonvolatile content (N.V.) of 52.8% and a number average molecular weight of 6,600. Hereafter, this polymer is referred to as polymer (A-I).

REFERENCE EXAMPLE 2

(Same as above)

A solution of an acrylic polymer possessing both a substituted methyl ester group and a hydroxyl group, with an N.V. of 52.5% and a number average molecular weight of 7,100 was produced in the same manner as in Reference Example 1 with the exception that a mixture of 18 parts of ST, 64 parts of B MA, 38 parts of B A, 42 parts of isopropyloxymethyl methacrylate and 28 parts of 2-hydroxypropyl methacrylate was employed as the monomer. Hereafter, this polymer is referred to as polymer (A-2).

REFERENCE EXAMPLE 3

(Same as above)

184 parts of a compound shown by the following formula,

$$CH_2=CHOC(CH_2)_4COCH_2OCH_3 \quad [IV]$$

99 parts of 4-hydroxybutyl vinyl ether, 197 parts of ethyl vinyl ether, 480 parts of chlorotrifluoroethylene, 640 parts of methylisobutylketone, 19.2 parts of 2,2'-azobis (2,4-dimethylvaleronitrile) (ABV), and 19.2 parts of an ester (mol ratio=2:1) of 4-hydroxy-1,2,2,6,6-pentamethylpiperidine and sebacic acid were placed in a two liter autoclave, and the polymerization reaction was allowed to proceed for 20 hours at 60° C. to produce a solution of a fluoroolefin polymer possessing both a substituted methyl ester group and a hydroxyl group, with an N.V. of 59.0% and a number average molecular weight of 21,000. Hereafter, this polymer is referred to as polymer (A-3).

REFERENCE EXAMPLE 4

[Preparation of a polymer (A) possessing both a substituted methyl ester group and a carbamyloxy group]

100 parts of xylene and 60 parts of n-butyl acetate were placed in a reaction vessel similar to that of Reference Example 1, and the temperature of the mixture was raised to 100° C. under a nitrogen atmosphere.

Subsequently, at the same temperature, a mixture of 20 parts of ST, 44 parts of methyl methacrylate (MMA), 50 parts of BA, 35 parts of MMMA, 50 parts of 2-(N-methylcarbamyloxy)ethyl methacrylate, 4 parts of TBO, 1 part of TBZ, and 40 parts of n-butyl acetate was added dropwise over the course of 5 hours.

After completion of the dropwise addition, the mixture was maintained at the same temperature for 15 hours to produce a solution of an acrylic polymer possessing both a substituted methyl ester group and a carbamyloxy group, with a N.V. of 51.8% and a number average molecular weight of 8,600. Hereafter, this polymer is referred to as polymer (A-4).

REFERENCE EXAMPLE 5

(Same as above)

A solution of an acrylic polymer possessing both a substituted methyl ester group and a carbamyloxy group, with an N.V. of 52.5% and a number average molecular weight of 8,200 was produced in the same manner as in Reference Example 4 with the exception that a mixture of 18 parts of ST, 64 parts of MMA, 38 parts of BA, 42 parts of ethoxymethyl methacrylate and 38 parts of 2-carbamyloxyethyl methacrylate was employed as the monomer. Hereafter, this polymer is referred to as polymer (A-5).

REFERENCE EXAMPLE 6

[Preparation of a polymer (A) possessing both a substituted methyl ester group and an acetoacetoxy group]

160 parts of xylene were placed in a reaction vessel similar to that of Reference Example 1, and the temperature of the xylene was raised to 105° C. under a nitrogen atmosphere.

Subsequently, at the same temperature, a mixture of 20 parts of ST, 32 parts of BMA, 58 parts of BA, 34 parts of MMMA, 56 parts of 2-(acetoacetoxy)ethyl methacrylate (AAEM), 4 parts of TBO, 1 part of TBZ and 40 parts of n-butyl acetate was added dropwise over the course of 3 hours.

After completion of the dropwise addition, the mixture was maintained at the same temperature for 1.5 hours to produce a solution of an acrylic polymer possessing both a substituted methyl ester group and an acetoacetoxy group, with a N.V. of 53% and a number average molecular weight of 6,800. Hereafter, this polymer is referred to as polymer (A-6).

REFERENCE EXAMPLE 7

(Same as above)

160 parts of xylene were placed in a reaction vessel similar to that of Reference Example 1, and the temperature of the xylene was raised to 100° C. under a nitrogen atmosphere.

Subsequently, at the same temperature, a mixture of 20 parts of ST, 50 parts of BMA, 56 parts of BA, 38 parts of ethoxymethyl acrylate, 36 parts of AAEM, 4 parts of TBO, 1 part of TBZ and 40 parts of n-butyl acetate was added dropwise over the course of 3 hours.

After completion of the dropwise addition, the mixture was maintained at the same temperature for 15 hours to produce a solution of an acrylic polymer possessing both a substituted methyl ester group and an acetoacetoxy group, with a N.V. of 53% and a number average molecular weight of 6,900. Hereafter, this polymer is referred to as polymer (A-7).

REFERENCE EXAMPLE 8

(Same as above)

160 parts of xylene were placed in a reaction vessel similar to that of Reference Example 1, and the temperature of the xylene was raised to 100° C. under a nitrogen atmosphere.

Subsequently, at the same temperature, a mixture of 20 parts of ST, 32 parts of BMA, 66 parts of BA, 34 parts of MMMA, 40 parts of 2-(acetoacetoxy)butyl methacrylate, 4 parts of TBO, 1 part of TBZ and 40 parts of n-butyl acetate was added dropwise over the course of 5 hours.

After completion of the dropwise addition, the mixture was maintained at the same temperature for 15 hours to produce a solution of an acrylic polymer possessing both a substituted methyl ester group and an acetoacetoxy group, with a N.V. of 52% and a number average molecular weight of 7,000. Hereafter, this polymer is referred to as polymer (A-8).

REFERENCE EXAMPLE 9

[Preparation of a polymer (A) possessing both a substituted methyl ester group and an epoxy group]

160 parts of xylene were placed in a reaction vessel similar to that of Reference Example 1, and the temperature of the xylene was raised to 100° C. under a nitrogen atmosphere.

Subsequently, at the same temperature, a mixture of 18 parts of ST, 78 parts of BMA, 35.6 parts of BA, 34.8 parts of MMMA, 33.6 parts of glycidyl methacrylate (GMA), 4 parts of TBO, 1 part of TBZ and 40 parts of xylene was added dropwise over the course of 4 hours.

After completion of the dropwise addition, the mixture was maintained at the same temperature for 15 hours to produce a solution of an acrylic polymer possessing both a substituted methyl ester group and an epoxy group, with a N.V. of 51% and a number average molecular weight of 7,900. Hereafter, this polymer is referred to as polymer (A-9).

REFERENCE EXAMPLE 10

[Preparation of a polymer (A) possessing both a substituted methyl ester group and an N-n-butoxymethylamido group]

300 parts of xylene were placed in a reaction vessel similar to that of Reference Example 1, and the temperature of the xylene was raised to 60° C. under a nitrogen atmosphere.

Subsequently, at the same temperature, a mixture of 100 parts of ST, 100 parts of BMA, 108 parts of BA, 87 parts of MMMA, 105 parts of N-n-butoxymethylacrylamide (BMAM), 2.5 parts of TBO, 20 parts of ABV, and 100 parts of xylene was added dropwise over the course of 6 hours.

After completion of the dropwise addition, the mixture was maintained at the same temperature for 15 hours to produce a solution of an acrylic polymer possessing both a substituted methyl ester group and an N-n-butoxymethylamido group, with a N.V. of 56% and a number average molecular weight of 9,000. Hereafter, this polymer is referred to as polymer (A-10).

REFERENCE EXAMPLE 11

[Preparation of a polymer (A) possessing both a substituted methyl ester group and a carbamate group]

80 parts of xylene and 80 parts of n-butyl acetate were placed in a reaction vessel similar to that of Reference Example 1, and the temperature of the mixture was raised to 100° C. under a nitrogen atmosphere.

Subsequently, at the same temperature, a mixture of 18 parts of ST, 78 parts of BMA, 19.2 parts of BA, 34.8 parts of MMMA, 50 parts of N-methyl 2-methacryloyloxyethyl carbamate, 4 parts of TBO, 1 part of TBZ, and 40 parts of n-butyl acetate was added dropwise over the course of 4 hours.

After completion of the dropwise addition, the mixture was maintained at the same temperature for 15 hours to produce a solution of an acrylic polymer possessing both a substituted methyl ester group and a carbamate group, with a N.V. of 51% and a number average molecular weight of 8,000. Hereafter, this polymer is referred to as polymer (A-11).

REFERENCE EXAMPLE 12

[Preparation of a polymer (A) possessing both a substituted methyl ester group and a dimethylureido group]

A solution of an acrylic polymer possessing both a substituted methyl ester group and a dimethylureido group, with an N.V. of 50% and a number average molecular weight of 8,200 was prepared in the same manner as in Reference Example 11 with the exception that a mixture of 18 parts of ST, 57.6 parts of BMA, 35.6 parts of BA, 34.8 parts of methoxymethyl acrylate, and 54 parts of N,N-dimethyl-N'-(2-methacryloyloxyethyl) urea was employed as the monomer. Hereafter, this polymer is referred to as polymer (A-12).

REFERENCE EXAMPLE 13

[Preparation of a polymer (A) possessing both a substituted methyl ester group and a O-iminocarbamate group]

A solution of an acrylic polymer possessing both a substituted methyl ester group and O-iminocarbamate group, with an N.V. of 50% and a number average molecular weight of 7,900 was prepared in the same manner as in Reference Example 11 with the exception that a mixture of 20 parts of ST, 10 parts of MMA, 40 parts of BMA, 19 parts of BA, 46 parts of n-butoxymethyl methacrylate, and 65 parts of a methacrylic acid ester monomer possessing the following structure [V] was employed as the monomer. Hereafter, this polymer is referred to as polymer (A-13).

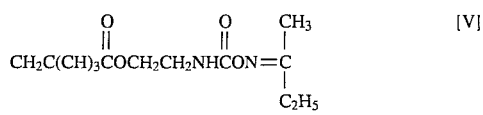

REFERENCE EXAMPLE 14

[Preparation of a polymer (C) possessing a substituted methyl ester group]

160 parts of xylene were placed in a reaction vessel similar to that of Reference Example 1, and the temperature of the xylene was raised to 110° C. under a nitrogen atmosphere.

Subsequently, at the same temperature, a mixture of 18 parts of ST, 100 parts of BMA, 36 parts of BA, 46 parts of MMMA, 4 parts of TBO, 1 part of TBZ and 40 parts of xylene was added dropwise over the course of 5 hours.

After completion of the dropwise addition, the mixture was maintained at the same temperature for 15 hours to produce a solution of an acrylic polymer possessing a substituted methyl ester group, with a N.V. of 53% and a number average molecular weight of 6,600. Hereafter, this polymer is referred to as polymer (C-1).

REFERENCE EXAMPLE 15

(Same as above)

184 parts of a compound shown by the following formula,

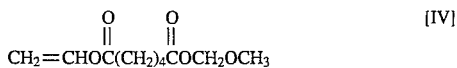

288 parts of ethyl vinyl ether, 480 parts of chlorotrifluoroethylene, 640 parts of methylisobutylketone, 19.2 parts of ABV, and 19.2 parts of an ester (mol ratio=2:1) of 4-hydroxy-1,2,2,6,6-pentamethylpiperidine and sebacic acid were placed in a two liter stainless steel autoclave, and the polymerization reaction was allowed to proceed for 20 hours at 60° C. to produce a solution of a fluoroolefin polymer possessing a substituted methyl ester group, with an N.V. of 58% and a number average molecular weight of 22,000. Hereafter, this polymer is referred to as polymer (C-2).

REFERENCE EXAMPLE 16

[Preparation of a compound (D) possessing a hydroxyl group]

240 parts of xylene were placed in a reaction vessel similar to that of Reference Example 1, and the temperature of the xylene was raised to 110° C. under a nitrogen atmosphere.

Subsequently, at the same temperature, a mixture of 105 parts of ST, 580 parts of BMA, 1.20 parts of lauryl methacrylate, 243 parts of HEMA, 21 parts of azobisisobutyronitrile (AIBN), and 210 parts of xylene was added dropwise over the course of 5 hours.

After completion of the dropwise addition, the mixture was maintained at the same temperature for 15 hours and xylene was then added to produce a solution of an acrylic polymer possessing a hydroxyl group, with a N.V. of 47% and a number average molecular weight of 8,800. Hereafter, this polymer is referred to as polymer (D-1).

REFERENCE EXAMPLE 17

(Same as above)

A mixture of 1,866 parts of neopentyl glycol, 172 parts of 1,6-hexane diol, 1,760 parts of dimethyl terephthalate and 1.9 parts of zinc acetate was allowed to react first at 150° C. for 1 hour while removing the methanol generated from the reaction system, and further at 210° C. for 2 hours. 132 parts of trimethylolpropane, 1,576 parts of terephthalic acid and 2.3 parts of dibutyltin oxide were then added, and dehydration condensation was performed by heating for 4 hours at the same temperature, and then for an additional 15 hours at 240° C. to yield a resin with a hydroxyl value of 63. This resin was then diluted with cyclohexanone to produce a hydroxyl group-containing polyester resin with an N.V. of 50%. Hereafter, this resin is referred to as polymer (D-2).

REFERENCE EXAMPLE 18

(Same as above)

134 parts of trimethylolpropane, 342 parts of ε-caprolactone and 1 part of tetraisopropyl titanate were placed in a reaction vessel similar to that of Reference Example 1, and the mixture was allowed to react for 10 hours at 160° C. under a nitrogen atmosphere to produce a polyester resin with a number average molecular weight of 500. Hereafter, this resin is referred to as polymer (D-3).

REFERENCE EXAMPLE 19

[Preparation of a compound (D) possessing a carbamyloxy group]

A solution of an acrylic polymer possessing a carbamyloxy group, with an N.V. of 52% and a number average molecular weight of 9,200 was produced in the same manner as in Reference Example 4 with the exception that a mixture of 20 parts of ST, 42 parts of BMA, 40 parts of MMA, 31 parts of BA and 66 parts of 2-(N-methylcarbamyloxy)ethyl methacrylate was employed as the monomer. Hereafter, this polymer is referred to as polymer (D-4).

REFERENCE EXAMPLE 20

(Same as above)

A mixture of 1,866 parts of neopentyl glycol, 172 parts of 1,6-hexane diol, 1,760 parts of dimethyl terephthalate and 1.9 parts of zinc acetate was allowed to react first at 150° C. for 1 hour while removing the methanol generated from the reaction system, and further at 210° C. for 2 hours. 132 parts of trimethylolpropane, 1,576 parts of terephthalic acid and 2.3 parts of dibutyltin oxide were then added, and dehydration condensation was performed by heating for 4 hours at the same temperature, and then for an additional 15 hours at 240° C. to yield a hydroxyl group-containing polyester resin with a hydroxyl value of 63.

Subsequently, 1,000 parts of this resin was dissolved in 1,111 parts of cyclohexanone, and 111 parts of n-butyl isocyanate and 1 part of dibutyltin dilaurate were added, then the mixture was allowed to react for 1.0 hours at 100° C. to produce a polyester resin possessing an N-n-butylcarbamyloxy group with a N.V. of 50%. Hereafter, this resin is referred to as polymer (D-5).

REFERENCE EXAMPLE 21

[Preparation of a compound (D) possessing an acetoacetoxy group]

160 parts of xylene were placed in a reaction vessel similar to that of Reference Example 1, and the temperature of xylene was raised to 110° C. under a nitrogen atmosphere.

Subsequently, at the same temperature, a mixture of 20 parts of ST, 60 parts of BMA, 46 parts of BA, 76 parts of AAEM, 4 parts of TBO, 1 part of TBZ and 40 parts of xylene was added dropwise over the course of 3 hours.

After completion of the dropwise addition, the mixture was maintained at the same temperature for 15 hours to produce a solution of an acrylic polymer possessing an acetoacetoxy group, with a N.V. of 52% and a number average molecular weight of 6,800. Hereafter, this polymer is referred to as polymer (D-6).

REFERENCE EXAMPLE 22

[Preparation of a compound (D) possessing an epoxy group]

280 parts of xylene were placed in a reaction vessel similar to that of Reference Example 1, and the temperature of xylene was raised to 110° C. under a nitrogen atmosphere.

Subsequently, at the same temperature, a mixture of 20 parts of ST, 42 parts of BMA, 36.8 parts of BA, 101.2 parts of GMA, 12 parts of TBO, 2 parts of TBZ and 20 parts of xylene was added dropwise over the course of 5 hours.

After completion of the dropwise addition, the mixture was maintained at the same temperature for 15 hours to produce a solution of an acrylic polymer possessing an epoxy group, with a N.V. of 42% and a number average molecular weight of 2,900. Hereafter, this polymer is referred to as polymer (D-7).

REFERENCE EXAMPLE 23

[Preparation of a compound (D) possessing an N-n-butoxymethylamido group]

A solution of an acrylic polymer possessing an N-n-butoxymethylamido group, with an N.V. of 56% and a number average molecular weight of 8,800 was prepared in the same manner as in Reference Example 10 with the exception that a mixture of 100 parts of ST, 200 parts of BMA, 60 parts of BA and 140 parts of BMAM was employed as the monomer. Hereafter, this polymer is referred to as polymer (D-8).

REFERENCE EXAMPLE 24

[Preparation of a compound (D) possessing a dimethylureido group]

A solution of an acrylic polymer possessing a dimethylureido group, with an N.V. of 51% and a number average molecular weight of 8,000 was produced in the same manner as in Reference Example 12 with the exception that a mixture of 20 parts of ST, 10 parts of MMA, 60 parts of BMA, 35 parts of BA and 75 parts of N,N-dimethyl-N'-(methacryloyloxyethyl)urea was employed as the monomer. Hereafter, this polymer is referred to as polymer (D-9).

REFERENCE EXAMPLE 25

[Preparation of polymer (A) possessing both a substituted methyl ester group and a hydroxyl group]

50 parts of xylene and 50 parts of n-butyl acetate were placed in a reaction vessel similar to that of Reference Example 1, and the temperature of the mixture was raised to 120° C. under a nitrogen atmosphere.

Subsequently, at the same temperature, a mixture of 35 parts of ST, 16 parts of MMA, 15 parts of BMA, 17 parts of MMMA, 17 parts of HEMA, 4 parts of AIBN, 1 part of benzoylperoxide (BPO) and 20 parts of n-butyl acetate was added dropwise over the course of 4 hours.

After completion of the dropwise addition, the polymerization reaction was allowed to proceed at the same temperature for 10 hours. Afterwards, the solvent was removed from the resulting polymer solution under reduced pressure using a thin layer distillation apparatus to produce a solid acrylic polymer possessing both a substituted methyl ester group and a hydroxyl group, with a number average molecular weight of 5,500 and a softening point (measured by a ball-and-ring method) of 110° C. Hereafter, this polymer is referred to as polymer (A-14).

REFERENCE EXAMPLES 26–29

[Preparation of polymer (A) possessing both a substituted methyl ester group and an active hydrogen-containing group or an epoxy group]

Solid acrylic polymers (A-15)–(A-18) possessing both an active hydrogen-containing group or an epoxy group and a substituted methyl ester group were prepared as in Reference Example 25 with the exception that the mixtures shown in Table 1 were respectively employed as the monomers therein. The data of the number average molecular weight and softening point of each polymer are summarized and shown in the same Table.

TABLE 1(1)

|  | Reference Example 25 | Reference Example 26 | Reference Example 27 |
|---|---|---|---|
| ST | 35 | 35 | 30 |
| MMA | 16 | 16 | 21 |
| BMA | 15 | 7 |  |
| BA |  |  | 3 |
| MMMA | 17 | 17 | 17 |
| Monomer (1) |  | 25 |  |
| AAEM |  |  | 29 |
| HEMA | 17 |  |  |
| Number average molecular weight | 5,500 | 5,700 | 5,900 |
| Softening point (°C.) | 110 | 113 | 107 |
| Polymer term | A-14 | A-15 | A-16 |

<Footnotes for Table 1>
"Monomer (1)" abbreviation of 2-(N-methylcarbamyloxy)ethyl methacrylate

TABLE 1(2)

|  | Reference Example 28 | Reference Example 29 |
|---|---|---|
| ST | 30 | 35 |
| MMA | 20 | 16 |
| BMA | 10 | 13 |
| BA | 12 |  |
| MMMA | 17 | 17 |
| N-methylacrylamide | 11 |  |
| GMA |  | 19 |
| Number average molecular weight | 5,600 | 5,500 |
| Softening point (°C.) | 111 | 110 |
| Polymer term | A-17 | A-18 |

REFERENCE EXAMPLE 30

[Preparation of compound (C) possessing a substituted methyl ester group]

A solid acrylic polymer possessing a substituted methyl ester group, with a number average molecular weight of 5,400 and a softening point of 114° C. was prepared in the same manner as in Reference Example 25 with the exception that a mixture of 10 parts of ST, 41 parts of MMA, 26 parts of BMA, and 23 parts of MMMA was employed as the monomer. Hereafter, this polymer is referred to as compound (C-3).

REFERENCE EXAMPLES 31–34

[Preparation of compounds (D) possessing an active hydrogen or an epoxy group]

Solid acrylic polymers (D-11)–(D-13) possessing an active hydrogen or an epoxy group, were prepared in the same manner as in Reference Example 25 with the exception that the mixtures shown in Table 2 were respectively employed as the monomers. The data of the number average molecular weight and softening point of each polymer are shown in the same Table 2.

TABLE 2

|  | Reference Example 31 | Reference Example 32 | Reference Example 33 | Reference Example 34 |
|---|---|---|---|---|
| ST | 10 | 10 | 10 | 10 |
| MMA | 35 | 34 | 41 | 40 |
| BMA | 22 | 15 | 20 | 15 |
| BA |  | 3 | 6 | 10 |
| Monomer (1) | 33 |  |  |  |
| AAEM |  | 38 |  |  |
| HEMA |  |  | 23 |  |
| GMA |  |  |  | 25 |
| Number average molecular wt. | 5,400 | 5,600 | 5,700 | 5,500 |
| Softening point (°C.) | 115 | 109 | 113 | 110 |
| Polymer term | D-10 | D-11 | D-12 | D-13 |

EXAMPLES 1–32

Various types of clear paints with an N.V. of 48% were prepared by appropriately combining the (A), (B), (C) and (D)-components and n-butyl acetate at the ratios shown in Table 3(1)–Table 3(8-2).

Furthermore, compounds employed as the (B) component in Table 3(1)–Table 3(8-2) are as follows.

(B-1) . . . dodecylbenzenesulfonic acid (B-2) . . . octyl phosphate (B-3) ... triphenylsilanol (B-4) ... aluminum trisethylacetoacetate (B-5) ... triethylamine salts of dodecylbenzenesulfonic acid Subsequently, the thus-obtained clear paints were coated onto a tin plate and either baked under the conditions shown in the Tables, or dried at room temperatures to produce a cured film with a film thickness of approximately 40 μm.

An evaluation of the solvent resistance, as well as the acid resistance of each paint film were then conducted. These results are shown in the Tables. In addition, the evaluation method and evaluation standard of each property are described below.

Solvent resistance: The cured film was rubbed ten times (both ways) with a piece of felt soaked with xylene; then, the change in appearance of the film was observed with the naked eye.

Acid resistance: 0.1 ml of a 10% aqueous solution of sulfuric acid was applied to the surface of the cured film, and then the film was placed in a air-circulating oven set to 70° C. for 30 minutes. The surface of the cured film was then washed and dried, and the change of the film surface was observed with the naked eye.

Acid resistance evaluation standard

⊙ ... No etching

○ ... Slight etching

X ... Conspicuous etching

TABLE 3(1)

|  | Example 1 | Example 2 | Example 3 | Example 4 |
|---|---|---|---|---|
| Polymer (A-1) | 1,000 | | | |
| Polymer (A-2) | | 1,000 | | |
| Polymer (A-3) | | | 1,000 | |
| Polymer (A-4) | | | | 1,000 |
| Compound (B-1) | 16 | 16 | | |
| Compound (B-2) | | | | 10 |
| n-butyl acetate | 117 | 115 | 229 | 90 |
| Curing Conditions | II | IV | VI | IV |
| Film Properties — Solvent resistance | No Change | | | |
| Film Properties — Acid resistance | ⊙ | ⊙ | ⊙ | ⊙ |

<Footnotes for Table 3>
I 100° C./30 minutes
II 120° C./30 minutes
III 140° C./30 minutes
IV 160° C./30 minutes
V 180° C./30 minutes
VI 200° C./30 minutes

TABLE 3(2)

|  | Example 5 | Example 6 | Example 7 | Example 8 |
|---|---|---|---|---|
| Polymer (A-5) | 1,000 | | | |
| Polymer (A-6) | | 1,000 | | |
| Polymer (A-7) | | | 1,000 | |
| Polymer (A-8) | | | | 1,000 |
| Compound (B-1) | 15 | 6 | 7 | 7 |
| n-butyl acetate | 110 | 155 | 111 | 90 |
| Curing Conditions | III | I | II | II |
| Film Properties — Solvent resistance | No Change | | | |
| Film Properties — Acid resistance | ⊙ | ⊙ | ⊙ | ⊙ |

TABLE 3(3)

|  | Example 9 | Example 10 | Example 11 | Example 12 |
|---|---|---|---|---|
| Polymer (A-9) | 1,000 | | | |
| Polymer (A-10) | | 1,000 | | |
| Polymer (A-11) | | | 1,000 | |
| Polymer (A-12) | | | | 1,000 |
| Compound (B-2) | | 11.2 | | |
| Compound (B-3) | 10 | | | |
| Compound (B-4) | 5 | | | |
| Compound (B-5) | | | 15.3 | 15 |
| n-butyl acetate | 78 | 179 | 79 | 58 |
| Curing Conditions | III | IV | IV | IV |
| Film Properties — Solvent resistance | No Change | | | |
| Film Properties — Acid resistance | ⊙ | ⊙ | ⊙ | ⊙ |

TABLE 3(4-1)

|  | Example 13 | Example 14 | Example 15 | Example 16 |
|---|---|---|---|---|
| Polymer (A-13) | 1,000 | | | |
| Compound (B-1) | 10 | 32 | 27 | |
| Compound (B-2) | | | | 18 |
| Compound (C-1) | | 1,000 | | |
| Compound (C-2) | | | 1,000 | |
| Compound (C-3) | | | | 108 |
| Compound (D-1) | | 788 | | |
| Compound (D-4) | | | | 1,000 |
| Compound (D-14) | | | 1,342 | |
| n-butyl acetate | 53 | 254 | 573 | 219 |

<Footnotes for Table 3>
Compound (C-3) abbreviation of bismethoxymethyl adipate
Compound (D-14) abbreviation of "Fluonate K-706" [hydroxyl group-containing fluoroolefin copolymer solution produced by Dainippon Ink and Chemicals, Inc.; solvent = xylene, N.V. = 60%; hydroxyl value of solids = 72; number average molecular weight = 10,000 (approx.)]

TABLE 3(4-2)

|  | Example 13 | Example 14 | Example 15 | Example 16 |
|---|---|---|---|---|
| Curing Conditions | III | V | V | V |
| Film Properties — Solvent resistance | No Change | | | |
| Film Properties — Acid resistance | ⊙ | ⊙ | ⊙ | ⊙ |

TABLE 3(5-1)

|  | Example 17 | Example 18 | Example 19 | Example 20 |
|---|---|---|---|---|
| Compound (B-1) | | 15 | 12 | |
| Compound (B-3) | | | | 20 |
| Compound (B-4) | | | | 10 |
| Compound (B-5) | 20 | | | |
| Compound (C-1) | 1,000 | 1,000 | 1,000 | |
| Compound (C-2) | | | | 1,000 |
| Compound (D-3) | 147 | | | |

TABLE 3(5-1)-continued

|  | Example 17 | Example 18 | Example 19 | Example 20 |
|---|---|---|---|---|
| Compound (D-6) |  | 1,000 |  |  |
| Compound (D-7) |  |  |  | 707 |
| Compound (D-15) |  |  | 119 |  |
| n-butyl acetate | 264 | 183 | 225 | 129 |

<Footnotes for Table 3>
Compound (D-15) abbreviation of trimethylolpropane trisacetoacetate

TABLE 3(5-2)

|  |  | Example 17 | Example 18 | Example 19 | Example 20 |
|---|---|---|---|---|---|
| Curing Conditions |  | VI | IV | V | IV |
| Film Properties | Solvent resistance |  | No Change | | |
|  | Acid resistance | ○ | ⊙ | ⊙ | ⊙ |

TABLE 3(6)

|  |  | Example 21 | Example 22 | Example 23 | Example 24 |
|---|---|---|---|---|---|
| Compound (B-1) |  | 16 |  | 21.2 | 21.2 |
| Compound (B-5) |  |  | 41 |  |  |
| Compound (C-1) |  |  | 1,000 | 1,000 | 1,000 |
| Compound (C-3) |  | 62 |  |  | 1,000 |
| Compound (D-2) |  | 1,000 |  |  |  |
| Compound (D-5) |  |  | 1,733 |  |  |
| Compound (D-8) |  |  |  | 950 |  |
| Compound (D-9) |  |  |  |  | 1,039 |
| n-butyl acetate |  | 126 | 200 | 281 | 193 |
| Curing Conditions |  | V | V | IV | IV |
| Film Properties | Solvent resistance |  | No Change | | |
|  | Acid resistance | ○ | ○ | ⊙ | ⊙ |

TABLE 3(7)

|  |  | Example 25 | Example 26 | Example 27 | Example 28 |
|---|---|---|---|---|---|
| Polymer (A-1) |  | 1,000 |  |  | 1,000 |
| Polymer (A-4) |  |  | 1,000 | 1,000 |  |
| Compound (B-1) |  | 8 | 14 | 13 |  |
| Compound (B-5) |  |  |  |  | 22 |
| Compound (C-1) |  |  | 249 |  |  |
| Compound (C-2) |  |  |  | 233 |  |
| Compound (D-1) |  |  |  |  | 280 |
| Compound (D-4) |  | 507 |  |  |  |
| n-butyl acetate |  | 151 | 115 | 166 | 118 |
| Curing Conditions |  | III | III | II | V |
| Film Properties | Solvent resistance |  | No Change | | |
|  | Acid resistance | ⊙ | ⊙ | ⊙ | ⊙ |

TABLE 3(8-1)

|  | Example 29 | Example 30 | Example 31 | Example 32 |
|---|---|---|---|---|
| Polymer (A-1) |  | 1,000 |  |  |
| Polymer (A-4) |  |  | 1,000 |  |
| Polymer (A-6) |  |  |  | 1,000 |
| Compound (B-1) |  | 16 | 16 | 17 |
| Compound (B-3) | 15.7 |  |  |  |
| Compound (B-4) | 7.8 |  |  |  |

TABLE 3(8-1)-continued

|  | Example 29 | Example 30 | Example 31 | Example 32 |
|---|---|---|---|---|
| Compound (C-1) | 1,000 |  |  |  |
| Compound (D-6) | 200 |  |  |  |
| Compound (D-16) | 150 |  |  |  |
| n-butyl acetate | 308 | 111 | 96 | 101 |

<Footnotes for Table 3>
Compound (D-16) abbreviation of sorbitol polyglycidyl ether with an epoxy equivalent weight of 170

TABLE 3(8-2)

|  |  | Example 29 | Example 30 | Example 31 | Example 32 |
|---|---|---|---|---|---|
| Curing Conditions |  | III |  | VII |  |
| Film Properties | Solvent resistance |  | No Change | | |
|  | Acid resitance | ⊙ | ⊙ | ⊙ | ⊙ |

<Footnotes for Table 3>
VII Drying for 8 days at room temperature

EXAMPLES 33–39

All of these Examples relate to a method for forming a film, in particular, these Examples show embodiments of a multi-layer coat finishing.

(1) Preparation of a paint for the base coat (base coat paint)

Base coat paint I

A mixture of the three components listed below was diluted to a viscosity of 13 seconds with a Ford Cup #4 by adding a mixed solvent possessing a composition of toluene/ 2-ethoxyethylacetate (90/10 parts by weight ratio) to produce a black-colored paint.

| Carbon black-containing color base (Carbon black concentration = 30%) | 6.5 parts |
|---|---|
| "Acrydic 44-127" | 100 parts |
| "Burnock DN-950" | 19.5 parts |

*Note:
"Acrydic 44-127" . . . (Hydroxyl group-containing acrylic resin solution produced by Dainippon Ink and Chemicals, Inc.; N.V.=50%; hydroxyl value of solution=32.5)

"Burnock DN-950" . . . (Polyisocyanate prepolymer solution produced by Dainippon Ink and Chemicals, Inc.; N.V.=75%; content of isocyanate group=1.2.5 weight % (with respect to the solution))

Base coat paint II

A mixture of the three components listed below was diluted to a viscosity of 13 seconds with a Ford Cup #4 by adding a mixed solvent possessing a composition of toluene/ n-butyl acetate/2-ethoxyethyl acetate (70/20/10 parts by weight ratio) to produce a metallic paint.

| "Alpaste 1700NL" | 10 parts |
|---|---|
| "Acrydic 44-127" | 100 parts |
| "Burnock DN-950" | 19.5 parts |

*Note:
"Alpaste 1700NL" . . . (Aluminum paste produced by Toyo Aluminum Co., Ltd.; content of aluminum=65%)

Base coat paint III

A mixture of the three components listed below was diluted to a viscosity of 13 seconds with a Ford Cup #4 by adding a mixed solvent possessing a composition of toluene/2-ethoxyethyl acetate (90/10 parts by weight ratio) to produce a metallic paint.

| | |
|---|---|
| "Alpaste 1700NL" | 10 parts |
| "Acrydic 47-712" | 100 parts |
| "Super Beckamine L-117-60" | 23.8 parts |

*Note:

"Acrydic 47-712" . . . (Hydroxyl group-containing acrylic resin solution produced by Dainippon Ink and Chemicals, Inc.; N.V.=50%)

(2) Preparation of a paint for the top coat

From the aforementioned Examples, clear paints were appropriately selected and respectively diluted to a viscosity of 20 seconds with a Ford Cup #4 by adding "Solvesso 100" (aromatic hydrocarbon mixture produced by Exxon Inc. U.S.A.) to produce various clear paints for the top coat.

In this manner, 6 types of clear paints for the top coat were prepared by using each clear paint obtained in Examples 2, 9, 14, 26, 27 and 28, and hereinafter, they are referred to as "TC-1", "TC-2", "TC-3", "TC-4", "TC-5", and "TC-6", respectively.

(3) Preparation of a multi-layer paint film

A steel plate pre-coated with a polyester-melamine paint and then baked was employed as the substrate to be coated.

In these Examples, the base coat paints and top coat paints shown in Table 4 were employed.

Initially, the base coat paint was air-sprayed to the aforementioned coated steel plate such that a dried film thickness of the base coat is to be approximately 20 μm. After allowing this coated plate to stand at room temperature for 5 minutes, the top coat paint was air-sprayed thereon such that a dried film thickness of the top coat is to be approximately 30 μm.

Subsequently, various multi-layer cured films were obtained by either baking or drying at room temperature under the conditions shown in Table 4. All of the thus-obtained multilayer cured films displayed an excellent appearance.

In addition, the solvent resistance and acid resistance of each multilayer cured film were evaluated in the same manner as in the aforementioned Examples. The results of these evaluations are summarized in the same Table.

TABLE 4(1)

| | Example 33 | Example 34 | Example 35 | Example 36 |
|---|---|---|---|---|
| Base coat paint | I | II | II | III |
| Top coat paint | TC-4 | TC-5 | TC-6 | TC-1 |
| Curing Conditions | VII | VII | VII | IV |
| Film Prop- erties Solvent resistance | No Change | | | |
| Film Prop- erties Acid resistance | ⊙ | ⊙ | ⊙ | ⊙ |

| | Example 37 | Example 38 | Example 39 |
|---|---|---|---|
| Base coat paint | III | III | III |
| Top coat paint | TC-2 | TC-3 | TC-6 |
| Curing Conditions | III | V | V |
| Film Properties Solvent resistance | No Change | | |
| Film Properties Acid resistance | ⊙ | ⊙ | ⊙ |

EXAMPLES 40–49

Mixtures shown in Tables 5(1)~(3) were respectively kneaded at temperatures of 80°~100° C. using a "Buss-Ko-Kneader PR-46" (Melt extruder produced by Buss AG Basel [Switzerland]), and then pulverized using a pulverizer. Subsequently, each powder thus obtained was sieved through a 150 mesh stainless steel wire gauze thereby removing the coarse particle to produce a powder coating.

Each of the resultant powder coatings was then electrostatically sprayed onto a zinc phosphate-treated steel plate, and baked under the conditions shown in Tables 5(1)~(3) to produce cured films with a film thickness of approximately 40 μm.

The solvent resistance and acid resistance of each cured film were evaluated in the same manner as in the aforementioned Examples. The results of these evaluations are summarized in the same Tables.

TABLE 5(1)

| | Example 40 | Example 41 | Example 42 | Example 43 |
|---|---|---|---|---|
| Polymer (A-14) | 1,000 | | | |
| Polymer (A-15) | | 1,000 | | |
| Polymer (A-16) | | | 1,000 | |
| Polymer (A-17) | | | | 1,000 |
| Compound (B-5) | 30 | 30 | 30 | 30 |
| Compound (B-6) | | | | |
| "Modaflow" | 5 | 5 | 5 | 5 |
| Curing Conditions | V | | | |
| Film Prop- erties Solvent resistance | No Change | | | |
| Film Prop- erties Acid resistance | ⊙ | ⊙ | ⊙ | ⊙ |

<Footnote for Table 5>
"Modaflow" Flow controlling agent produced by Monsanto Co., Ltd. [U.S.A.])

TABLE 5(2)

| | Example 44 | Example 45 | Example 46 |
|---|---|---|---|
| Polymer (A-18) | 1,000 | | |
| Compound (B-5) | | 30 | 30 |
| Compound (B-6) | 30 | | |
| Compound (C-3) | | 500 | 500 |
| Compound (D-10) | | 500 | |
| Compound (D-11) | | | 500 |
| "Modaflow" | 5 | 5 | 5 |
| Curing Conditions | V | | |
| Film Properties Solvent resistance | No Change | | |
| Film Properties Acid resistance | ⊙ | ⊙ | ⊙ |

TABLE 5(3)

| | Example 47 | Example 48 | Example 49 |
|---|---|---|---|
| Compound (B-5) | 30 | | 30 |
| Compound (B-6) | | 30 | |
| Compound (C-3) | 500 | 500 | 500 |
| Compound (D-12) | 500 | | |
| Compound (D-13) | | 500 | |
| Compound (D-17) | | | 500 |
| "Modaflow" | 5 | 5 | 5 |

TABLE 5(3)-continued

| | Example 47 | Example 48 | Example 49 |
|---|---|---|---|
| Curing Conditions | | V | |
| Film Properties Solvent resistance | | No Change | |
| Acid resistance | ◉ | ◉ | ◉ |

<Footnotes for Table 5>
Compound (D-17) "Finedic M-8024" [Solid hydroxyl group-containing polyester resin produced by Dainippon Ink and Chemicals, Inc.; number average molecular weight = 2,000 (approx.); hydroxyl value = 110]

Comparative Example 1

1,000 parts of the hydroxyl group-containing compound (D-1) obtained in Reference Example 16, 335 parts of "Super Beckamine L-117-60", and 63 parts of n-butyl acetate were mixed to produce a clear paint with an N.V. of 48%.

Subsequently, this paint was coated onto a tin plate by air spraying to form a dried layer thickness of 40 μm, and then baked for 30 minutes at 140° C. to produce a cured film.

The solvent resistance and acid resistance of the thus-obtained cured film were evaluated in the same manner as in the aforementioned Examples. Although this film displayed an excellent solvent resistance, remarkable etching and whitening were observed in the acid resistance test. This shows the cured film obtained from the composition of this Comparative Example has remarkably inferior acid resistance.

Field of Industrial Use

The curable composition of the present invention can be used for baking applications to form a cured film possessing a excellent acid resistance, and the like. This curable composition can also be used for room temperature curing applications to produce a cured film possessing excellent acid resistance, and the like without using polyisocyanate. Thus, the composition of the present invention is suitable for practical use.

We claim:

1. A curable composition comprising as an essential component a polymer (A) possessing both at least one substituted methyl ester group represented by the general formula I,

—CO₂CH₂OX    I wherein X represents a monovalent organic group and at least one active hydrogen-containing group and/or one epoxy group.

2. A curable composition comprising as an essential component a polymer (A) possessing both at least one substituted methyl ester group represented by the general formula I,

—CO₂CH₂OX    I wherein X represents a monovalent organic group and at least one active hydrogen-containing group and/or one epoxy group; and a curing catalyst (B).

3. A curable composition as recited in one of claims 1 or 2, wherein X of said substituted methyl ester group represented by the general formula I,

—CO₂CH₂OX    I is a straight-chain, cyclic or branched alkyl group possessing 1–10 carbon atoms.

4. A composition as recited in one of claims 1 or 2, wherein said active hydrogen-containing group is at least one group selected from the group consisting of a hydroxyl group, an alkoxymethylamino group represented by —NHCH₂OR, a methylolamino group represented by —NHCH₂OH, a group containing a carboxylic acid amide bond represented by —CO—NH—, a group containing a urethane bond represented by —OCONH—, a group containing a urea bond represented by =N—CONH—, a group containing a 1,3-dicarbonyl group, and a group containing a sulfonamide bond represented by —SO₂NH—.

5. A composition as recited in one of claims 1 or 2, wherein said active hydrogen-containing group is at least one group selected from the group consisting of a carboxylic acid amido group, an N-methylol carboxylic acid amido group, an N-alkoxymethyl carboxylic acid amido group, a carbamyloxy group, an N-mono-substituted carbamyloxy group, an isocyanate group blocked with a ketoxime, an isocyanate group blocked with an alcohol, an isocyanate group blocked with a carboxylic acid amide, and an acetoacetoxy group.

6. A composition as recited in one of claims 1 and 2, wherein said polymer (A) is a vinyl polymer.

7. A composition as recited in claim 6, wherein said vinyl polymer is an acrylic polymer.

8. A composition as recited in claim 6, wherein said vinyl polymer is a fluoroolefin polymer.

9. A composition as recited in claim 2, wherein said curing catalyst is a protonic acid, or a salt thereof, selected from the group consisting of an organic sulfonic acid, an organic sulfinic acid, an acidic phosphorus compound containing a hydroxyl group bonded to a phosphorus atom, and a halocarboxylic acid.

10. A composition as recited in claim 2, wherein said curing catalyst is a mixture of a silanol group-containing compound and/or a silicon compound generating silanol groups by hydrolysis and a metal chelate compound.

11. A composition as recited in claim 2, wherein said curing catalyst is an onium salt generating cationic species upon heating.

12. A composition as recited in one of claims 1 or 2, wherein said curable composition is a composition for liquid paints.

13. A composition as recited in one of claims 1 or 2, wherein said curable composition is a composition for powder coatings.

14. A method for forming a film comprising the steps of:
coating a paint for a base coat containing a pigment onto a material to be coated;
coating a liquid paint for a top coat containing as an essential component a polymer (A) possessing at least one substituted methyl ester group represented by general formula I,

—CO₂CH₂OX    I wherein X represents a monovalent organic group and at least one active hydrogen-containing group and/or an epoxy group; and curing the coated two layers therein.

15. A method for forming a film comprising the steps of:
coating a paint for a base coat containing a pigment onto a material to be coated;
coating a liquid paint for a top coat containing as essential components a polymer (A) possessing both at least one substituted methyl ester group represented by general formula I, $$-CO_2CH_2OX \qquad I$$

wherein X represents a monovalent organic group and at least one active hydrogen-containing group and/or an epoxy group; and a curing catalyst (B); and curing the coated two layers therein.

16. A method for forming a film as recited in claim 14 or 15, wherein said active hydrogen-containing group is at least one group selected from the group consisting of a hydroxyl group, an alkoxymethylamino group represented by —NHCH$_2$OR, a methylolamino group represented by —NHCH$_2$OH, a group containing a carboxylic acid amide bond represented by —CO—NH—, a group containing a urethane bond represented by —OCONH—, a group containing a urea bond represented by =N—CONH—, a group containing a 1,3-dicarbonyl group, and a group containing a sulfonamide bond represented by —SO$_2$NH—.

17. A method for forming a film as recited in claim 14 or 15, wherein said active hydrogen-containing group is at least one group selected from the group consisting of a carboxylic acid amido group, an N-methylol carboxylic acid amido group, an N-alkoxymethyl carboxylic acid amido group, a carbamyloxy group, an N-mono-substituted carbamyloxy group, an isocyanate group blocked with a ketoxime, an isocyanate group blocked with an alcohol, an isocyanate group blocked with a carboxylic acid, and an acetoacetoxy group.

18. A method for forming a film as recited in claim 14 or 15, wherein said polymer (A) is a vinyl polymer.

19. A method for forming a film as recited in claim 18, wherein said vinyl polymer is an acrylic polymer.

20. A method for forming a film as recited in claim 18, wherein said vinyl polymer is a fluoroolefin polymer.

* * * * *